(12) United States Patent
Zinser

(10) Patent No.: US 10,910,801 B2
(45) Date of Patent: Feb. 2, 2021

(54) STRIPPING TOOL

(71) Applicant: WEZAG GmbH Werkzeugfabrik, Stadtallendorf (DE)

(72) Inventor: Roman Zinser, Neustadt (DE)

(73) Assignee: WEZAG GmbH Werkzeugfabrik, Stadtallendorf (DE)

( * ) Notice: Subject to any disclaimer, the term of this patent is extended or adjusted under 35 U.S.C. 154(b) by 871 days.

(21) Appl. No.: 15/001,297

(22) Filed: Jan. 20, 2016

(65) Prior Publication Data
US 2016/0226229 A1    Aug. 4, 2016

(30) Foreign Application Priority Data
Feb. 3, 2015   (EP) .................................... 15153683

(51) Int. Cl.
*H02G 1/00* (2006.01)
*H02G 1/12* (2006.01)

(52) U.S. Cl.
CPC ........... *H02G 1/005* (2013.01); *H02G 1/1212* (2013.01)

(58) Field of Classification Search
CPC .... H02G 1/005; H02G 1/1212; H02G 1/1241; H02G 1/1217; H02G 1/1219; H02G 1/1221; H02G 1/1224; H02G 1/1231; H02G 1/1234; H02G 1/00; H02G 1/12; B25B 7/00; B25B 27/146; B25G 1/066
See application file for complete search history.

(56) References Cited

U.S. PATENT DOCUMENTS

| | | | |
|---|---|---|---|
| 3,731,561 A | | 5/1973 | Mongredien |
| 3,915,037 A | * | 10/1975 | Wiener ................ H02G 1/1212 81/9.43 |
| 4,341,134 A | * | 7/1982 | Yamazaki ............ H02G 1/1212 81/9.41 |

(Continued)

FOREIGN PATENT DOCUMENTS

| | | |
|---|---|---|
| CN | 2370593 Y | 3/2000 |
| CN | 104242164 A | 12/2014 |

(Continued)

OTHER PUBLICATIONS

U.S. Appl. No. 14/804,450, Cable Stripping Tool, Roman Zinser, filed Jul. 21, 2015, 52 pages.
(Continued)

*Primary Examiner* — Robert J Scruggs
(74) *Attorney, Agent, or Firm* — The Sladkus Law Group

(57) ABSTRACT

A stripping tool is formed by stripping pliers. In use, the stripping tool is closable with a closing stroke having a cutting stroke part, a stripping stroke part and a free stroke part. In the cutting stroke part, a closing movement moves at least one stripping blade into a closed position so that the stripping blade cuts into the insulating sheeting of a cable to be stripped. During the stripping stroke part, the cut insulating sheeting is partially stripped from the cable. In the free stroke part, the stripping blades are laterally passed alongside the partially stripped part of the insulating sheeting. A transition point from the stripping stroke part to the free stroke part is adjustable so that it is possible to change the length over which the separated part is partially stripped without any change of the length of the closing stroke of the stripping tool.

25 Claims, 19 Drawing Sheets

(56) References Cited

U.S. PATENT DOCUMENTS

| | | | | |
|---|---|---|---|---|
| 4,485,696 | A | * | 12/1984 | Bieganski ............ H02G 1/1212 30/90.1 |
| 4,768,404 | A | * | 9/1988 | Biegasnki ............ H02G 1/1212 81/9.43 |
| 4,892,015 | A | * | 1/1990 | Beetz ................... H02G 1/1212 81/9.41 |
| 5,572,911 | A | * | 11/1996 | Schmode ............ H02G 1/1212 81/9.43 |
| 5,713,249 | A | * | 2/1998 | Liversidge ........... H02G 1/1212 81/9.41 |
| 5,724,871 | A | * | 3/1998 | Wall ..................... H02G 1/1212 81/9.43 |
| 6,895,836 | B2 | * | 5/2005 | Hetland ............... H02G 1/1212 81/44 |
| 7,171,712 | B2 | | 2/2007 | Konen |
| 7,409,736 | B2 | | 8/2008 | Konen |
| 7,513,177 | B2 | * | 4/2009 | Hofmann ............. H02G 1/1204 81/9.41 |
| 7,841,260 | B2 | * | 11/2010 | Storm .................. H02G 1/1212 30/90.1 |
| 7,913,588 | B2 | * | 3/2011 | Storm .................. H02G 1/1212 81/9.41 |

FOREIGN PATENT DOCUMENTS

| | | |
|---|---|---|
| DE | 3733358 | 3/1989 |
| EP | 2056415 | 5/2009 |
| EP | 2056416 | 5/2009 |
| JP | 2013-055812 A | 3/2013 |
| TW | 200607200 A | 2/2006 |

OTHER PUBLICATIONS

EP 14 177 826.6, European application entitled Abisolierwerkzeug, applicant is Wezag GmbH Werkzeugfabrik, filed Jul. 21, 2014, 36 pages.

Office Action dated Mar. 4, 2019 in co-pending Taiwanese Patent Application Publication No. 200607200.

* cited by examiner

STRIPPING TOOL

CROSS REFERENCE TO RELATED APPLICATIONS

This application claims priority to co-pending European patent application No. EP 15 153 683.6 entitled "Abisolierwerkzeug", filed Feb. 3, 2015.

FIELD OF THE INVENTION

An electrical wire of an electrical cable (in particular formed with a plurality of stranded wires) comprises an insulating sheeting (in particular made of plastic) for providing an electrical insulation against the environment. For an electrical connection of the cable to plugs or any other electrical components it is necessary to remove a sleeve-like part of the insulation in an end region of the cable. For this purpose stripping tools are used. In a cutting stroke part, the stripping tools at least partially severe the sheeting in the end region. Then, in a subsequent stripping stroke part, the previously at least partially severed sleeve-like part of the sheeting is "torn off" and pulled from the electrical wire. Whereas it is generally possible that the sleeve-like severed part of the sheeting is completely removed from the electrical wire by the stripping tool, it might also be of interest to move the sleeve-like part in the stripping stroke part only a small path on the electrical wire away from the remaining part of the sheeting. In this state, the severed part of the sheeting protects the electrical wire during storage or prior to the provision of the desired electrical connection. If the electrical wire is formed with a plurality of strands, the only partially stripped sleeve-like part avoids that the strands "fan out" which might complicate the later provision of the connection to a plug or to any other electrical component and which might also lead to a braking off of single strands. It might also be desirable that (e.g. dependent on the diameter of the cable, the diameter and material of the electrical wire and/or the sheeting thickness and the material of the sheeting) it is possible to individually adjust the length of the path of the partial stripping of the sleeve-like sheeting by the stripping tool (so the length of the stripping stroke part).

In the following, with respect to the stripping tool it is preferably referred to the design of the stripping tool as stripping pliers without any limitation of the invention to the design of stripping pliers being intended.

BACKGROUND OF THE INVENTION

The publication DE 37 33 358 C1, corresponding to U.S. Pat. No. 4,892,015 A, discloses stripping pliers wherein an accommodation for a cable is formed in the region of the bit of tongs by two pliers jaws. With the closure of the hand levers, at first the pliers jaws are closed. Stripping blades are supported on both sides of the cable at the inner sides of the pliers jaws. With the continued closing movement of the pliers jaws, the sheeting of the cable is severed in a cutting stroke part. The cutting stroke part ends if the pliers jaws and therewith the stripping blades have been closed to an adjustable extent for which the severing of the sheeting has occurred. A stripping stroke part follows to the cutting stroke part. In the stripping stroke part the stripping blades are pulled together parallel to the longitudinal axis of the accommodation and therewith of the cable. This movement leads to a braking off of the sleeve-like sheeting and the stripping of the same from the electrical wire. During the stripping stroke part the stripping blades slide guided by the pliers jaws along the pliers jaws. This movement is caused by a pulling rod. An end region of the pulling rod is linked with scissor-like blade holders which support the stripping blades. The other end region of the pulling rod is approximately in the middle linked with a control lever. One end region of the control lever is linked to a movable hand lever, whereas the other end region of the control lever is guided by a roller at a control link surface. The control link surface is formed by the movable pliers jaw. During the cutting stroke part the roller contacts an end region of the control link surface so that the control lever is able to cause the cutting stroke part with the closing movement of the pliers jaws and therewith the stripping blades. For actuating forces of sufficient amount at the end of the cutting stroke part, the roller overcomes an elevation of the control link surface defining a force threshold. The roller then slides along the control link surface which coincides with an actuation of the pulling rod and therewith the stripping stroke part. At the end of the stripping stroke part the roller approaches an angled region of the control link surface resulting in an open position of the movable pliers jaw. With the opening movement of the movable pliers jaw, the stripping blades move away from the cable. The length of the stripping stroke part is defined by constructive measures in the form of the distance of the afore mentioned end region of the control link surface from the angled region of the control link surface. It is assumed that the length of the stripping stroke part is defined by the dimensioning of the control link surface such that the length is sufficient for completely pulling the sleeve-like part of the sheeting from the electrical wire. The stripping pliers according to publication DE 37 33 358 C1 additionally comprise a separating unit for cutting through a cable for a preparation of the stripping process. For this purpose, the separating unit is actuated by actuation of the hand levers. Furthermore, the stripping pliers comprise an adjusting unit by which it is possible to adjust the extent of the closing movement of the stripping blades during the cutting stroke part. Corresponding stripping pliers are sold by the applicant under the label "Score 2" (see also the website www.wezag.de).

The publication EP 2 056 416 A2, corresponding to U.S. Pat. No. 7,913,588 B2, discloses stripping pliers wherein the length of the stripping stroke part is adjustable. For this purpose, a stop element limits the movement of a pulling rod which moves the stripping blades during the stripping stroke part parallel to the longitudinal axis of the accommodation for the cable to be stripped. For the design of the stop element the publication EP 2 056 416 A2 discloses different embodiments: For a first embodiment the stop element is formed by a pivotable L-shaped angled lever. A front side of a leg of the lever builds the stop element for the pulling rod. Accordingly, in the corresponding pivoting position of the lever, the length of the leg which builds the stop element for the pulling rod defines the end of the stripping stroke part. For another embodiment the publication EP 2 056 416 A2 proposes the provision of the stop element for the pulling rod by a damping member. For another embodiment a kind of flattened cam disc is used for providing the stop element. Here it is possible to latch the cam disc by a circumferential toothing in different angular positions for the adjustment of different stripping stroke parts. Furthermore, the publication EP 2 056 416 A2 proposes the provision of the stop element for the pulling rod by a spring blade which gives a haptical feedback for the user of the stripping pliers when reaching the end of the stripping stroke part which is defined by the spring blade. For this embodiment, it is also possible to extend the stripping stroke part when establishing a contact of the pulling rod with the spring blade and increasing the hand forces applied to the stripping pliers which leads to an increase of the elastical bias of the spring blade.

SUMMARY OF THE INVENTION

According to the invention, the stripping tool (in particular the stripping pliers) runs through a closing stroke wherein the drive is actuated in one direction without a reversal of the direction. For stripping pliers it is possible that the closing stroke is passed during the closing movement of the hand levers from any or a maximal open position to a minimal or any closed position.

Within the frame of the invention, the stripping pliers comprise a cutting stroke part. During the cutting stroke part there is a closing movement of at least one stripping blade in a closing direction having an orientation transverse to a longitudinal axis of an accommodation for a cable to be stripped. Here, during the cutting stroke part there is preferably a closing movement to an extent such that the stripping blades at least partially severe the circumference of a sheeting of the cable or that there is a circumferential severing of the sheeting.

Furthermore, the closing stroke of the stripping pliers comprises a stripping stroke part (or removal stroke part) which might directly follow to the cutting stroke part or might follow after another intermediate stroke part. During the stripping stroke part the closed position of the stripping blades previously achieved is (almost) upheld, whereas in the stripping stroke part the stripping blades are moved parallel to the longitudinal axis of the accommodation for the cable to be stripped. Due to the fact that the stripping blades are still (almost) in the closed position, the stripping blades engage into the insection of the sheeting. During the movement of the stripping blades during the stripping stroke part the front surfaces of the sleeve-like at least partially severed region of the insulating sheeting contact the stripping blade. Accordingly, during the stripping stroke part the stripping blade takes the sleeve-like part of the insulating sheeting "along" and at least partially removes the sleeve-like part of the insulating sheeting from the electrical wire.

Whereas the design of stripping pliers with a cutting stroke part as well as a stripping stroke part is also known from the above prior art, according to the invention the closing stroke additionally comprises an free stroke part. During the free stroke part the stripping blades are in an open position. Here, an open position denotes any position of the stripping blades wherein the stripping blades have a larger distance from the longitudinal axis of the accommodation than in the closed position during the stripping stroke part. The stripping blade has a distance from the longitudinal axis of the accommodation being so large that the stripping blade does not contact the front side of the severed sleeve-like part of the insulating sheeting. Accordingly, during the free stroke part the stripping blade is passed besides the sleeve-like part. If at the end of the stripping stroke part the sleeve-like severed part is still located in a partially removed state on the electrical wire (having a distance from the remaining insulating sheeting), the sleeve-like part is not moved further during the free stroke part. Here the invention covers embodiments wherein in the free stroke part in the open position the distance of the at least one stripping blade from the longitudinal axis of the accommodation for the cable is constant as well as embodiments wherein the distance of the stripping blade in the open position from the longitudinal axis of the accommodation changes unless it is provided that the stripping blade does not interact with the severed sleeve-like part during the free stroke part.

According to the invention, it is possible to adjust the transition point from the stripping stroke part to the free stroke part. Accordingly, the user is able to individually adjust the length of the stripping stroke part (e.g. for an adaptation to the length of the stripping to the diameter of the cable, the material and diameter of the electrical wire and/or the material and sheet thickness of the sheeting). Whereas it is also possible that with the adjustment of the transition point from the stripping stroke part to the free stroke part the length of the closing stroke changes, preferably the length of the closing stroke is independent on adjustments of the transition point from the stripping stroke part to the free stroke part.

The inventive design might lead to the following advantages:

For stripping pliers according to publication EP 2 056 416 A2 the length of the closing stroke changes in dependence on the length of the stripping stroke part defined by the stop element. This leads to non-uniform process conditions when using the stripping pliers. Instead, according to the invention, it is possible that the closing stroke is independent on the length of the stripping stroke part: When increasing [or decreasing] the stripping stroke part by adjusting the transition point, to the same extent the free stroke part is decreased [or increased]. Accordingly, for the operation of the stripping pliers there are defined process conditions. If the stripping pliers runs through the whole closing stroke familiar to the user with the complete closure of the hand levers, it is guaranteed that the working result according to the specifications has been achieved.

After the partial stripping of the sleeve-like part the cable is still located in the accommodation of the stripping pliers. For the reversed movement of the stripping pliers into the starting position it has to be provided that there is no interference of the cable with the partially stripped sleeve-like part. According to the publication EP 2 056 416 A2, after the end of the stripping stroke the stripping blades move in opposite direction parallel to the longitudinal axis of the accommodation. In some cases it is possible that during this movement the stripping blades interfere with the freed electrical wire between the sleeve-like part and the remaining sheeting which might result in damages of the electrical wire, damages of strands or also a fanning out of strands in this region. Instead, according to the invention, during the free stroke part the direction of movement of the stripping blades is not reversed to a direction towards the freed electrical wire. Instead, the stripping blades are passed along and besides the sleeve-like part. It is even possible that at the end of the free stroke part an opening movement of the stripping blades is provided. Accordingly, during an opening stroke following to the closing stroke the stripping blades are passed with an ample distance along the partially stripped sleeve-like part and the freed part of the electrical wire.

For one embodiment of the invention the stripping tool (in particular the stripping pliers) comprises a stripping blade. The stripping pliers comprise an accommodation. It is possible to position a cable to be stripped into the accommodation with the cable extending along a longitudinal axis defined by the accommodation. The stripping blade is guided by a guide. Here, it is possible that the guide directly guides the stripping blade or guides the stripping blade with an interposition of further components as a blade holder, a guiding body and the like. According to the invention, the guide of the stripping blade comprises two different guiding regions, namely a stripping guiding region and an free stroke guiding region:

In the stripping guiding region the stripping blade is guided parallel to the longitudinal axis of the accommodation for the cable to be stripped such that the stripping blade has a first distance from the longitudinal axis in the accommodation for the cable to be stripped. Here the first distance is smaller than the radius of the sheeting of the cable. Accordingly (after previously having caused a severing of the sheeting), in the stripping guiding region a front side of the sleeve-like part contacts the stripping blade so that in the stripping guiding region the stripping blade takes the sleeve-like part along which results in a partial removal of the sleeve-like part.

Instead, in the free stroke guiding region there is a guidance of the stripping blade with a component of the movement which has an orientation parallel to the longitudinal axis of the accommodation for the cable to be stripped with a second distance of the stripping blade from the longitudinal axis of the accommodation for the cable to be stripped. The second distance of the free stroke guiding region is larger than the first distance in the stripping guiding region so that in the free stroke guiding region the stripping blade does not engage the sleeve-like severed part. Instead, the stripping blade is passed alongside the sleeve-like part. The invention both covers embodiments wherein the second distance is constant in the free stroke guiding region as well as embodiments wherein the second distance changes during the free stroke guiding region as long as there is no interaction between the stripping blade and the partially removed sleeve-like part in the free stroke guiding region.

The transition point from the stripping guiding region to the free stroke guiding region is adjustable which is preferably the case without a change of the length of the closing stroke of the hand levers. For the adjustment of the transition point of the stripping guiding region to the free stroke guiding region it is possible to adjust the length of the stripping stroke part.

Within the frame of the invention any design of the guide might be used as long as the afore mentioned guiding directions and distances as specified above are guaranteed. For one embodiment of the invention, the guide is formed with a guiding body. The stripping blade is supported (at least with one force component) in a direction transverse to the longitudinal axis of the accommodation at the guiding body which might be provided by direct support or under the interposition of further components. The guiding body (which might be one piece or formed by a plurality of pieces) comprises a guiding surface which comprises different guiding surface parts:

In a stripping guiding region the guiding surface is formed with a level guiding surface part which guarantees that the stripping blade is held in the first distance so that the sleeve-like part is taken along.

Instead, the guiding surface forms a slanted or inclined guiding surface part in the free stroke guiding region which due to the slope serves for providing an opening movement of the stripping blade. Accordingly, the stripping blade gets out of contact with the sleeve-like partially stripped part. For an alternative or cumulative embodiment it is possible that in the free stroke guiding region the guiding surface comprises a guiding surface part with a distance from the longitudinal axis of the accommodation differing from the distance of the level guiding surface part in the stripping guiding region. Here it is possible that the guiding surface part has a level design so that the distance from the longitudinal axis of the accommodation is constant. It is also possible that the guiding surface part is curved so that the distance of the guiding surface part from the longitudinal axis of the accommodation changes unless it is provided that the stripping blade does not interact with the partially stripped sleeve-like part.

For the design of the guiding body and its integration into the stripping tool there are different options:

For a first embodiment, the guiding body is held at a fixed location at an associated tool jaw during the closing stroke. In this case the stripping blade is (directly or indirectly under interposition of further components) supported by a rolling or sliding contact in outer direction by the guiding surface of the guiding body. For adjusting the transition point from the stripping guiding region to the free stroke guiding region (so in particular for adjusting the length of the stripping stroke part) the guiding body is displaced relatively to the tool jaw (at least with one component of the movement) having an orientation parallel to the longitudinal axis of the accommodation.

For another embodiment of the invention, the guiding body is moved during the closing stroke relatively to the associated tool jaw which is in particular the case in a common movement with the stripping blade. In this case the guiding body with the guiding surface is supported by a supporting body which is held in a fixed location at the associated tool jaw during the closing stroke. To mention only some examples, the supporting body might be a pin, a roller or another sliding body. For this embodiment for adjusting the transition point from the stripping guiding region to the free stroke guiding region (and in particular for adjusting the length of the stripping stroke part), the supporting body is displaced relatively to the tool jaw (with at least one component of the movement) having an orientation parallel to the longitudinal axis of the accommodation.

For the adjustment of the transition point and the fixation of an adjusted transition point within the frame of the present invention there are a lot of options. For one proposal according to the invention, a position or different positions of the guiding body or the supporting body is/are secured by a latching, clamping or locking unit. Here, any securing of this type might be provided in single positions. Also all of a plurality of predetermined positions can be secured or it is possible to provide a stepless continuous securing in an adjusting region which might e.g. be provided by use of a clamping unit.

As explained above it is possible that the stripping blade (in some cases with a blade holder) is directly supported by the guiding body or even directly formed by the guiding body. According to another proposal of the invention an intermediate body is interposed between the stripping blade and the guiding body. By a drive (in particular hand levers of the stripping pliers) the intermediate body is moved together with the stripping blade. The intermediate body forms a contact surface which is slidingly moved along the guiding surface of the guiding body. The use of a contact surface of the intermediate body for the contact with the guiding surface of the guiding body increases the options for a design of the adjusting regions for adjusting the transition point from the stripping stroke part to the free stroke part and so for adjusting the length of the stripping stroke part.

Generally, within the frame of the invention it is possible to use any design of drive kinematic for the stripping tool. For a particular suggestion of the invention, the drive uses a pulling rod. Here, the stripping blade, a blade holder holding the stripping blade, the intermediate body and/or the guiding body is/are coupled to the pulling rod. When running through the closing stroke, the pulling rod is continuously moved parallel to the longitudinal axis of the accommodation of the stripping tool. Preferably, the length of the movement of the pulling rod parallel to the longitudinal axis of the accommodation is independent on the length of the stripping stroke part.

Preferably, the pulling rod is driven (e.g. by hand levers of stripping pliers) such that a switching kinematic applies. The switching kinematic guarantees that during the cutting stroke part the pulling rod is not moved parallel to the longitudinal axis of the accommodation of the stripping tool. This might have the consequence that during the cutting stroke part there is no undesired movement of the stripping blade in a direction towards the longitudinal axis of the cable. On the other hand, the afore mentioned switching kinematic provides that the pulling rod is moved both during the stripping stroke part as well as during the free stroke part (preferably with a continuous movement).

In the stripping tool (in particular with the switching kinematic as explained above) any kinematic might be used wherein the pulling rod is actuated by a pressure lever. One end region of the pressure lever is linked to a movable hand lever. During the closing stroke the other end region of the pressure lever is supported for a rolling or sliding movement by a guiding surface of a movable tool jaw. At the same time the other end region is supported for a rolling or sliding movement by the pulling rod. The force in the pressure lever which is caused by the actuation of the movable hand lever is distributed into a force component which acts upon the guiding surface of the movable tool jaw and into a force component which acts upon the pulling rod. The distribution depends on the inclination of the guiding surface and the angle of the pressure lever. Accordingly, it is possible that the guiding surface comprises a guiding surface part wherein the inclination of the guiding surface and the angle of the pressure lever are such that the force component acting upon the pulling rod is very small or smaller than the force of a spring biasing the pulling rod towards an end position. Accordingly, the actuation of the hand lever does not cause a movement of the pulling rod but only a movement of the movable tool jaw in closing direction so that with this movement the cutting stroke part is generated. Furthermore, another guiding surface part might be provided wherein the inclination of the guiding surface and the angle of the pressure lever are chosen such that the force component acting upon the pulling rod is sufficient such that the pulling rod gets out of the end position which triggers the stripping stroke part.

Another embodiment of the invention cares for the operational safety of the stripping tool. This design bases on the finding that in some cases it is disadvantageous if the stripping tool is open prior to its use and after its use (e.g. for storage and during transportation) such that the stripping blades are freely accessible through the bit of tongs. If e.g. the craftsman reaches into a tool box, for open bit of tongs the craftsman might contact the stripping blade with a finger which causes the risk of an injury. It is e.g. also possible that the stripping tool is thrown with opened bit of tongs into a tool box where another tool enters into the bit of tongs resulting to damages of the sensitive cutting edge of the stripping blade. According to the invention, this finding is considered by providing a securing unit by which it is possible to secure the stripping tool in an at least partially closed position.

It is possible that the securing unit is manually actuated and/or released. For a particular embodiment according to the invention, a separate manipulation of the securing unit by the user is not required for releasing the securing unit. Instead, for this design the securing unit is automatically released by the actuation of the drive of the stripping tool. For the example of stripping pliers it is e.g. possible that the securing unit is activated in a slightly opened state of the bit of tongs and of the hand levers. If the user actuates the hand levers of the stripping pliers in closing direction or even with a small remaining path to the completely closed position, it is possible to automatically release the latching or locking of the securing device by a small closing movement of the bit of tongs so that subsequent to this small actuation of the hand levers by the user the release of the hand levers leads to the complete opening of the stripping tool so that the stripping tool is ready for processing a cable.

For another proposal of the invention, another function is integrated into the stripping tool: Here, the stripping tool also comprises a separating unit by which it is possible to cut through a cable. For a preferred embodiment of the invention, the separating unit is not permanently open. Instead, it is possible to close or cover the separating unit by a protecting unit for avoiding injuries of the user and/or an unintended cutting though a cable in the environment of the stripping tool (e.g. in the region of a switch cabinet with a plurality of electrical cables not to be cut through).

Here it is e. g. possible that the protecting unit is manually activated and deactivated by the user. However, for a particular suggestion of the invention, the protecting unit is automatically transferred into the protecting position when running through the closing stroke. The protecting unit remains in the protecting position also after the end of the closing stroke and when reopening of the stripping tool by reversing the closing stroke. Accordingly, if the protecting unit is opened and a cable is cut through by the separating unit, in the beginning of the following stripping process the separating unit will still be open. With the first use of the stripping tool for a stripping process, the protecting unit will then automatically be transferred into the protecting position. For subsequent further stripping processes with the stripping tool, it is automatically avoided that the separating unit causes injuries of the user and/or that other cables are unintentionally cut through by the separating unit.

Whereas it is also possible that at the stripping tool the distance of the stripping blade from the longitudinal axis of the accommodation is fixedly defined at the end of the cutting stroke part, another proposal of the invention suggests that an adjusting unit for adjusting the cutting depth is provided at the stripping tool. By means of the adjusting unit for the cutting depth it is possible to adjust the distance of at least one stripping blade in a direction transverse to the longitudinal axis of the accommodation at the end of the cutting stroke part which can be used for an adaptation to different cables.

It is also possible that at one pliers jaw or at both pliers jaws there are provided the cutting depth adjusting unit as well as the required devices for providing the free stroke part and for the adjustments of the transition point from the stripping stroke part to the free stroke part. However, improved constructional space requirements might in some cases result if for another embodiment of the invention the adjusting unit for the cutting depth on the one hand and the guide of the stripping blade with the stripping guiding region and the free stroke guiding region on the other hand are located at different tool jaws.

For another embodiment of the invention, the stripping blades are exchangeable. To mention only one example, it is possible that the stripping blades are exchangeably held at a blade holder. It is possible that the stripping blades are held by a T-groove-connection with the blade holder wherein the T-groove has an orientation transverse to the movement of the tool jaws (cp. in particular the non-published European patent application EP 14 177 826.6). For this embodiment of the invention, the exchange of the stripping blades is only possible if the adjusted transition point from the stripping stroke part to the free stroke part corresponds to a predetermined location of the transition point or is located in a predetermined transitional region. Accordingly, it is not possible that the stripping blades are unintentionally released from the stripping tool if the adjusted transition point from the stripping stroke part to the free stroke part does not correspond to the predetermined transition point or the predetermined transitional region. By this measure the operational safety in increased and a damage of the stripping blades due to an unintended dropping is reduced. For the above embodiment, it is e.g. possible that for a transition point from the stripping stroke part to the free stroke part which does not correspond to the predetermined transition point or the predetermined transitional region the lateral removal of the stripping blade is blocked by a housing plate of the stripping tool. If instead the transition point from the stripping stroke part to the free stroke part is adjusted such that the transition point corresponds to the predetermined transition point or the predetermined transitional region, it is possible to laterally remove the stripping blade e.g. through a window or recess of the afore mentioned housing plate. Here the window or recess is only located in the lateral path of the stripping blade if the predetermined transition point has been achieved by adjustment.

For the above explanation of the invention reference is made to orientations relative to a longitudinal axis of the accommodation. Here, the longitudinal axis corresponds to the longitudinal axis of the cable to be stripped if the cable is located in the accommodation or the bit of tongs of the stripping tool. Any relative specification which refers to the longitudinal axis of the accommodation might apply only for a part of the closing stroke or might relate to a specific position of the tool jaws. If e.g. a direction is denoted as "transverse to the longitudinal axis" or "parallel to the longitudinal axis", there might be a support exactly transverse to the longitudinal axis or a guidance exactly parallel to the longitudinal axis if the tool jaws are completely closed, whereas it is possible that a direction of a guidance or of a support changes if the tool jaws are moved. Accordingly, the afore mentioned formulations enclose also directions wherein only a component of the direction has an orientation "transverse to the longitudinal axis" or "parallel to the longitudinal axis".

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In the description of the figures a stripping tool 1 is described in an embodiment as stripping pliers 2 without any limitation of the invention to this embodiment being intended.

Figure 1:
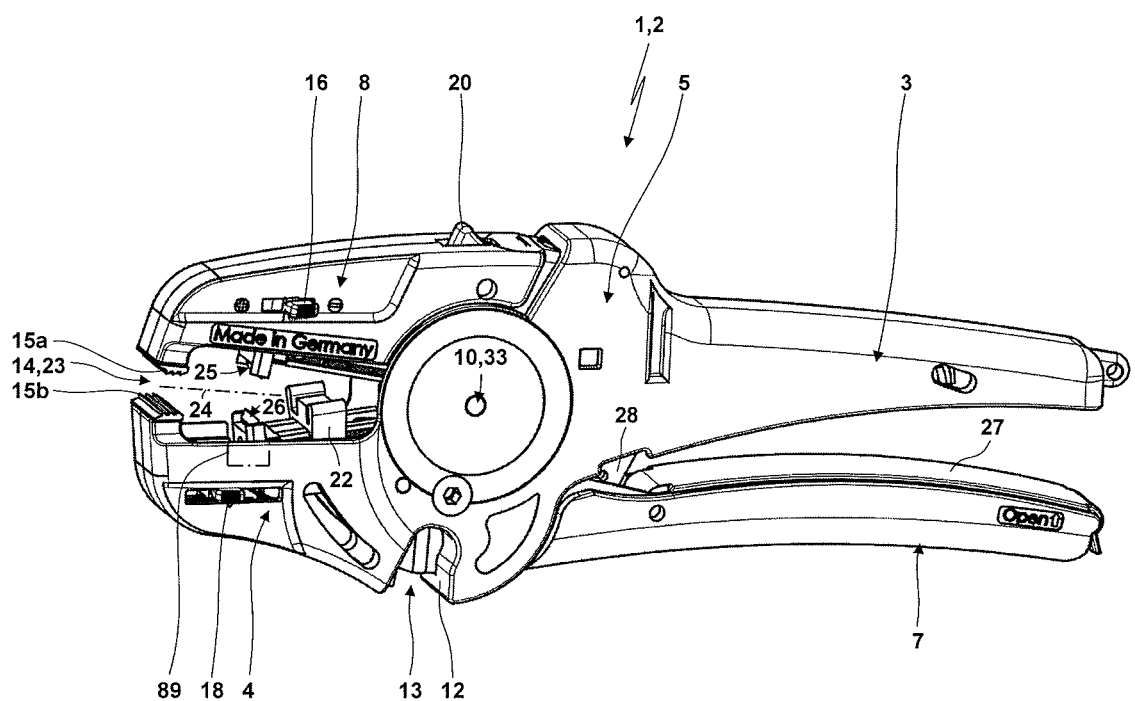
FIG. 1 shows a three-dimensional view of stripping pliers.
Figure 2:
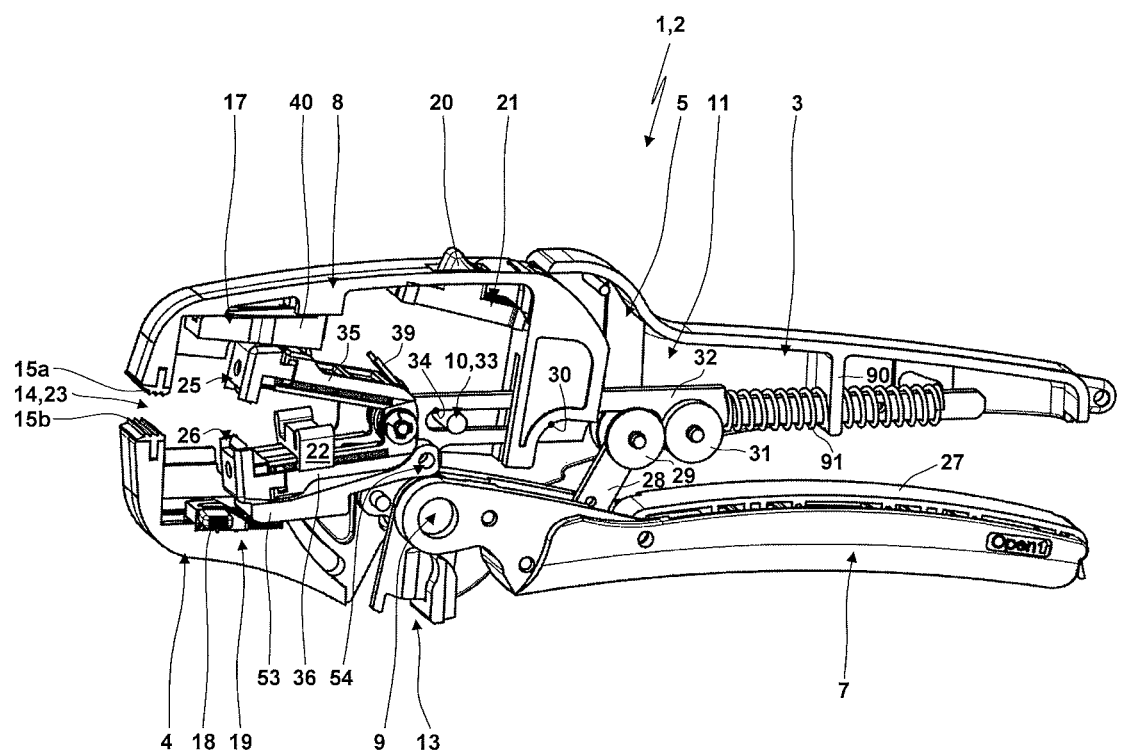
FIG. 2 shows the stripping pliers according to FIG. 1 in a three-dimensional sectional view.

According to FIG. 1, the stripping pliers 2 are formed with a fixed hand lever 3 and a fixed pliers jaw 4 which are here formed by an integral housing body 5. A movable hand lever 7 and a movable pliers jaw 8 are linked to the housing body 5 for being pivoted in a pivoting plane 6 which corresponds to the drawing plane according to FIGS. 3 to 11. Here, the movable hand lever is linked to the housing body 5 by a bearing 9 which can in particular be seen in FIG. 2. The movable pliers jaw 8 is linked to the housing body 5 by a bearing 10 located distant from the bearing 9. Only during the cutting stroke part 95 of the closing stroke 94 of the hand levers 3, 7 the pivoting movement of the movable hand lever 7 is coupled to the pivoting movement of the pliers jaw 8 which is proved by the drive kinematic 11 which will be explained in the following in further detail. In the outer region the housing body 5 comprises a recess 12 which is U-shaped in a first approximation. In the region of the recess 12 a separating unit 13 is located which serves for completely and level cutting through a cable (e.g. for the preparation of the cable for a stripping process). In the end region facing away from the bearing 10 the two pliers jaws 4, 8 build a bit of tongs 14. Clamping jaws 15a, 15b of the pliers jaws 4, 8 or the bit of tongs 14 serve/serves for holding a cable during the stripping process and during the closure of the pliers jaws 4, 8. Furthermore, in FIG. 1 an actuation means 16 protruding from the pliers jaw 8 (here a protrusion having an orientation transverse to the pivoting plane 6) can be seen by which it is possible to actuate an adjusting unit 17 for adjusting the cutting depth. An actuation means 18 (here a protrusion having an orientation transverse to the pivoting plane 6) protrudes from the pliers jaw 4. By the actuation means 18 it is possible to actuate the adjusting unit 19 for adjusting the stripping stroke part. Another actuation means 20 protrudes on the upper side from the pliers jaw 8. By the actuation means 20 it is possible to actuate a securing unit 21 by which it is possible to secure the stripping pliers 2 in an at least partially closed position. In FIG. 1 within the bit of tongs 14 a displaceable stop element 22 can be seen. With its front side facing to the clamping jaws 15a, 15b a cable introduced into the bit of tongs contacts the front side of the stop element 22. Accordingly, the stop element 22 defines how far it is possible to introduce the cable into the bit of tongs 14. Accordingly, the stop element 22 also defines the length of the stripped insulating sheeting of the cable. Together with the clamping jaws 15a, 15b and the stop element 22 the bit of tongs 14 builds an accommodation 23 for a cable. The accommodation 23 comprises a longitudinal axis 24 along which a cable held in the accommodation 23 extends. In a way further explained in the following On both sides of the longitudinal axis 24 stripping blades 25, 26 are each held and guided by pliers jaws 4, 8 within the bit of tongs 14.

For the shown embodiment, the hand lever 7 comprises an inner chamber closed by a lid 27. It is possible to store accessories of the stripping pliers 2 in the inner chamber, in particular clamping jaws 15a, 15b, stripping plates 25, 26 and/or stop elements 22 of the same or different geometries. It is possible that these accessories are held by the lid 27. With respect to further details and modifications of a device of this type for storing accessories, reference is made to the disclosure of the non-published European patent application EP 14 177 831.6.

For providing the drive kinematic 11, a pressure lever 28 is linked to the hand lever 7 for a pivoting movement in the pivoting plane 6. In the end region facing away from the hand lever 7 the pressure lever 28 supports a roller 29 for a rotating movement. During the cutting stroke part 95 the roller 29 rolls along a guiding surface 30 of the pliers jaw 8 (see FIG. 3). Here, in the region responsible for the cutting stroke part 95 the guiding surface 30 has e.g. the shape of a quadrant, whereas in another part (preferably associated with the stripping stroke part and/or the free stroke part) the guiding surface 30 has a level shape with an orientation along or parallel to the longitudinal axis 24. Additionally, the roller 29 is in rolling contact with a roller 31 which is linked to a pulling rod 32 for being pivoted. The pulling rod 32 is guided for a movement parallel to the longitudinal axis 24 which might be provided by a guiding slit in an intermediate wall 90 of the hand lever 3. A preloaded spring 91 is supported by the intermediate wall 90. The preloaded spring 91 biases the roller 31 towards the roller 29. A further guidance of the pulling rod 32 is provided by a bearing bolt 33 which extends through an elongated hole 34 of the pulling rod 32. The width of the elongated hole 34 corresponds (under provision of a sliding movement with a sliding tolerance) to the diameter of the bearing bolt 33. The bearing bolt 33 is multifunctional because also the bearing 9 for the pliers jaw 8 is formed with the bearing bolt 33. The bearing bolt 33 is fixed to the housing body 5.

In the end region facing towards the bit of tongs 14 two blade holders 35, 36 are linked to the pulling rod 32 for being pivoted around a bearing 93 in the pivoting plane 6. The blade holders 35, 36 are in a rough approximation arranged in a V-shape on both sides of the longitudinal axis 24. A pivoting movement of the blade holders 35, 36 around the bearing 93 leads to a change of the opening angle of the V. In the end regions facing away from the pulling rod 32 the stripping blades 25, 26 are held by the blade holders 35, 36. It is possible that the stripping blades 25, 26 are formed with a base body 37 e.g. made of plastic which provides the connection to the blade holders 35, 36 and the stripping blade bodies 38 which might be made of metal and form the cutting edges. With respect to the exchangeable connection of the stripping blades 25, 26 to the blade holders 35, 36, reference is made to the non-published European patent application EP 14 177 826.6 of the applicant. The blade holders 35, 36 and the stripping blades 25, 26 held by the blade holders 36, 36 are biased by a spring 39 (here a leg spring) in outer direction. The blade holder 35 with the associated stripping blade 25 is supported by the pliers jaw 8 under interposition of the adjusting unit 17 for adjusting the cutting depth. For the shown embodiment, the adjusting unit 17 for adjusting the cutting depth comprises a wedge-like adjusting body 40. If by actuation of the actuation means 16 the adjusting body 40 is displaced relatively to the pliers jaw 8 and the blade holder 35 and the stripping blade 25 in a direction parallel to the longitudinal axis 24, the angle of the leg formed by the stripping blade 25 and the blade holder 35 relative to the longitudinal axis 24 changes which causes a change of the cutting depth at the end of the cutting stroke part 95.

On the side facing away from the longitudinal axis 24 the blade holder 36 and the stripping blade 26 are supported at the pliers jaw 4 under interposition of the adjusting unit 19 for adjusting the stripping stroke part. The adjusting unit 19 for adjusting the stripping stroke part comprises a guiding body 41 which is more detailed shown in FIG. 4. On the side facing towards the stripping blade 26 and the blade holder 36 the guiding body 41 forms a guiding surface 42. This guiding surface 42 comprises here level-shaped guiding surface parts 43, 44, 45. The level guiding surface part 43 has an orientation parallel to the longitudinal axis 24 and comprises a distance 46 from the longitudinal axis 24. The guiding surface part 44 which is level for the shown embodiment and follows to the guiding surface part 43 in the direction away from the clamping jaws 15 is sloped in outward direction and continues with a kink in one end region to the here level guiding surface part 45. The guiding surface part 45 has an orientation parallel to the longitudinal axis 24 and a distance 47 from the longitudinal axis 24 which is larger than the distance 46 of the guiding surface part 43 from the longitudinal axis 24. The surface part 43 builds a stripping guiding region 48. If the stripping blades 26 are supported in the stripping guiding region 48 in the guiding surface part 43, the distance of the stripping blade 26 from the longitudinal axis 24 does not change. The guiding surface parts 44, 45 together build a free stroke guiding region 49. Whereas in the stripping guiding region 48 a distance 50 of the stripping blade 26 from the longitudinal axis 24 remains constant, in the first free stroke guiding section 51 which is provided by the guiding surface part 44 the distance of the stripping blade 26 from the longitudinal axis 24 increases. The distance increased in this way is then kept constant in the second free stroke guiding section 52 which is provided by the guiding surface part 45. It is possible that on the side facing away from the longitudinal axis 24 the stripping blade 26 and/or the blade holder 36 is/are directly supported by the guiding surface 42 of the guiding body 41 and slide along the same. For the shown embodiment, an intermediate body 53 is interposed between the stripping blade 26 and the blade holder 36 on the one hand and the guiding body 41 on the other hand. On the side of the intermediate body 53 facing towards the longitudinal axis 24 the stripping 26 and/or the blade holder 36 is/are supported. The side of the intermediate body 53 facing away from the longitudinal axis 24 is in sliding contact with the guiding surface 42 of the guiding body 41. For the shown embodiment, the intermediate body 53 is linked by a bearing 54 to an end region of the pulling rod 32 facing towards the bit of tongs 14. Accordingly, the translatory movement of the pulling rod 32 leads to the common translatory movement of the intermediate body 53 as well as of the blade holder 36 with the stripping blade 26. This translatory movement coincides with a sliding movement of the contact surface 55 provided by the intermediate body 53 along the guiding surface 42 of the guiding body 41. Differing from the embodiment explained above it is also possible that only the guiding surface parts 43, 44 are formed by the guiding body 41, whereas the further guiding surface part 45 is provided by the housing of the fixed pliers jaw 4.

Figure 3:
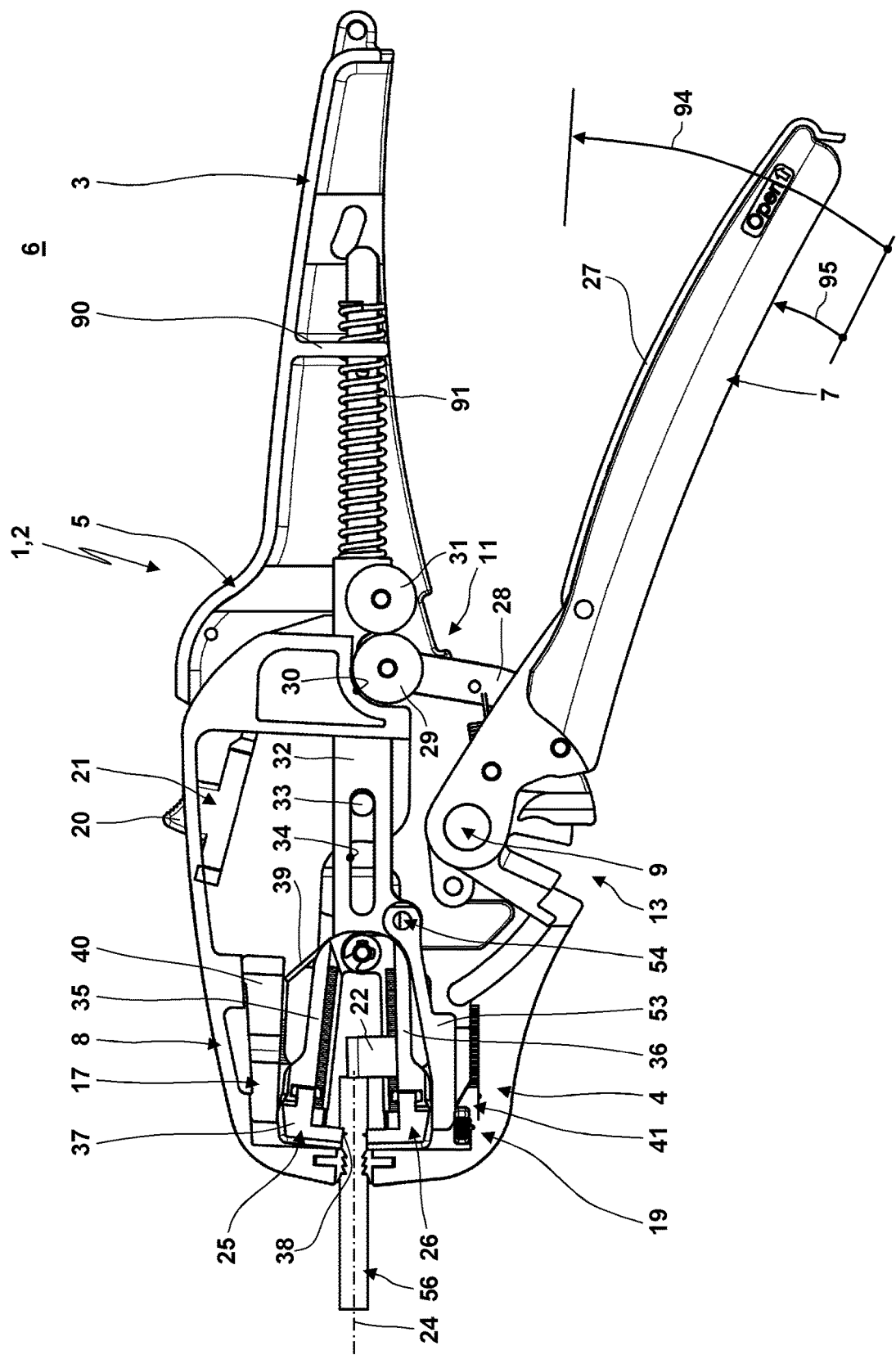
FIG. 3 shows the stripping pliers according to FIGS. 1 and 2 in a sectional view at the end of a cutting stroke part.
Figure 4:
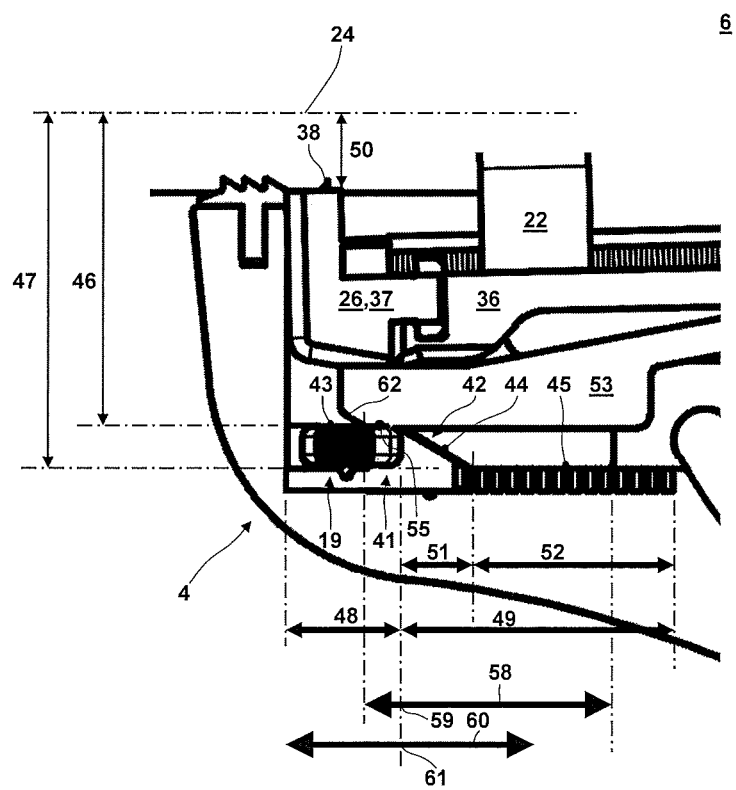
FIG. 4 shows a detail IV of the stripping pliers according to FIG. 3.
Figure 5:
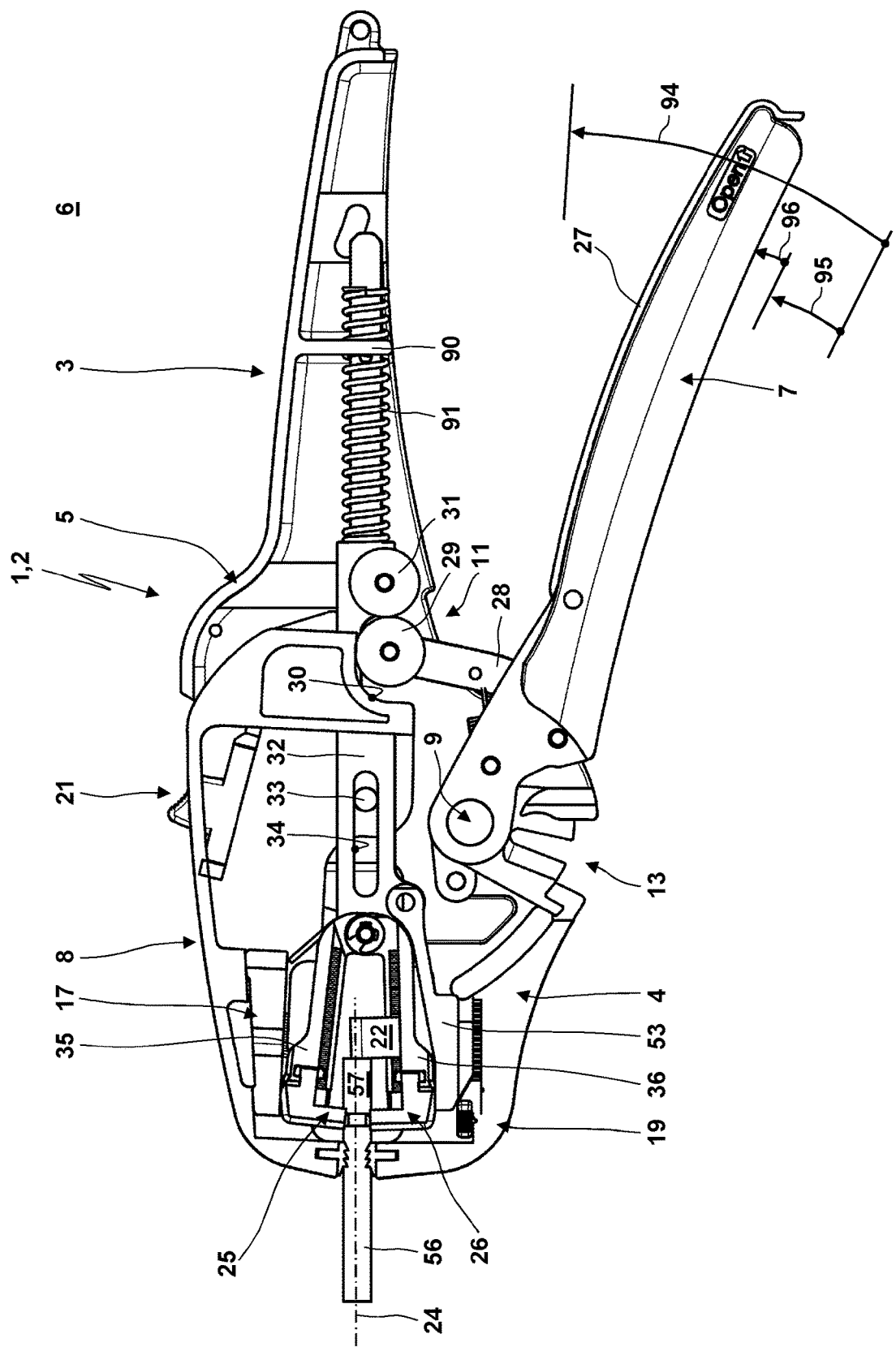
FIG. 5 shows in a sectional view the stripping pliers according to FIGS. 1 to 4 during the stripping stroke part.
Figure 6:
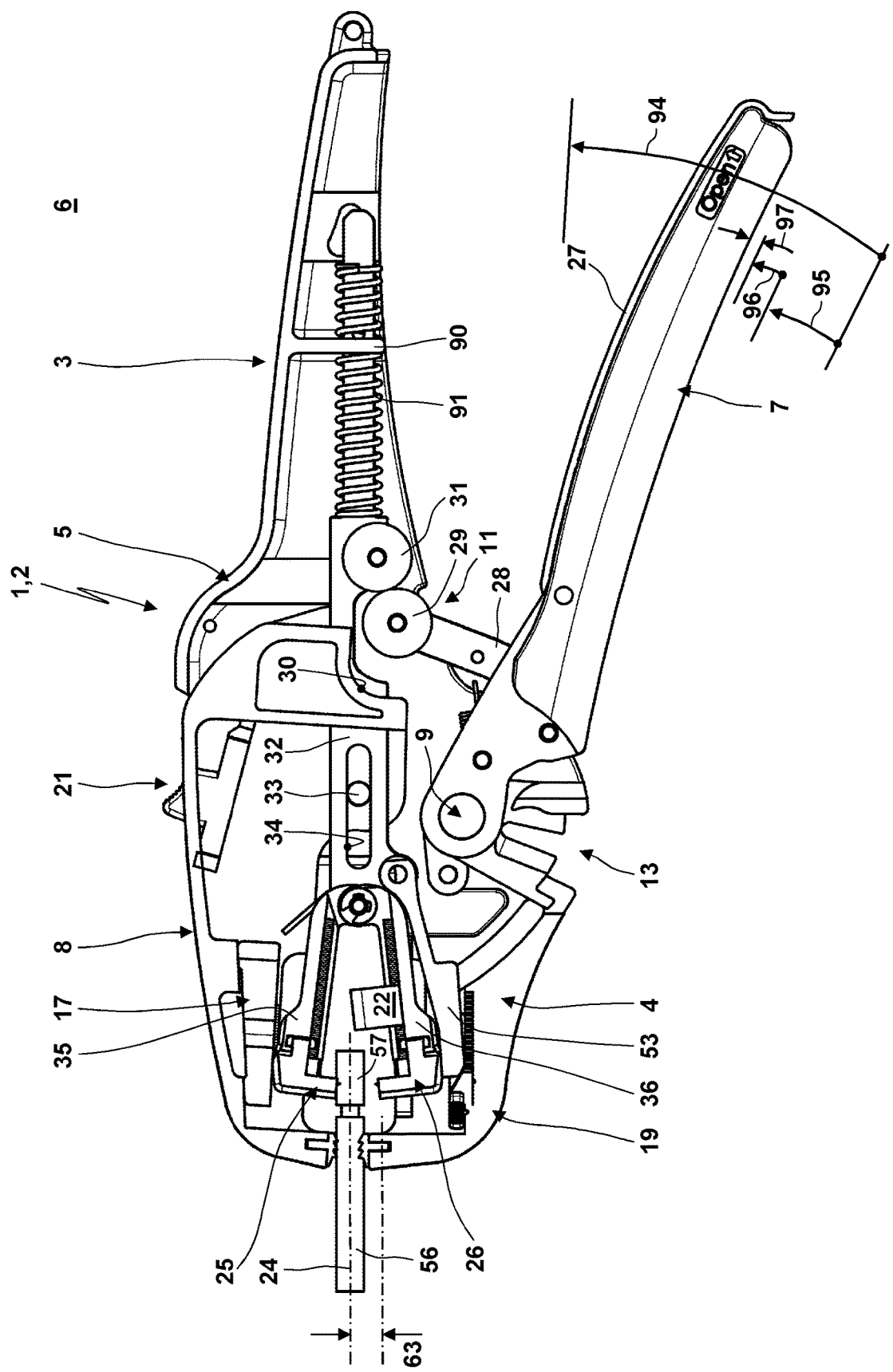
FIG. 6 shows in a part-sectional view the stripping pliers according to FIGS. 1 to 5 during the free stroke part.
Figure 7:
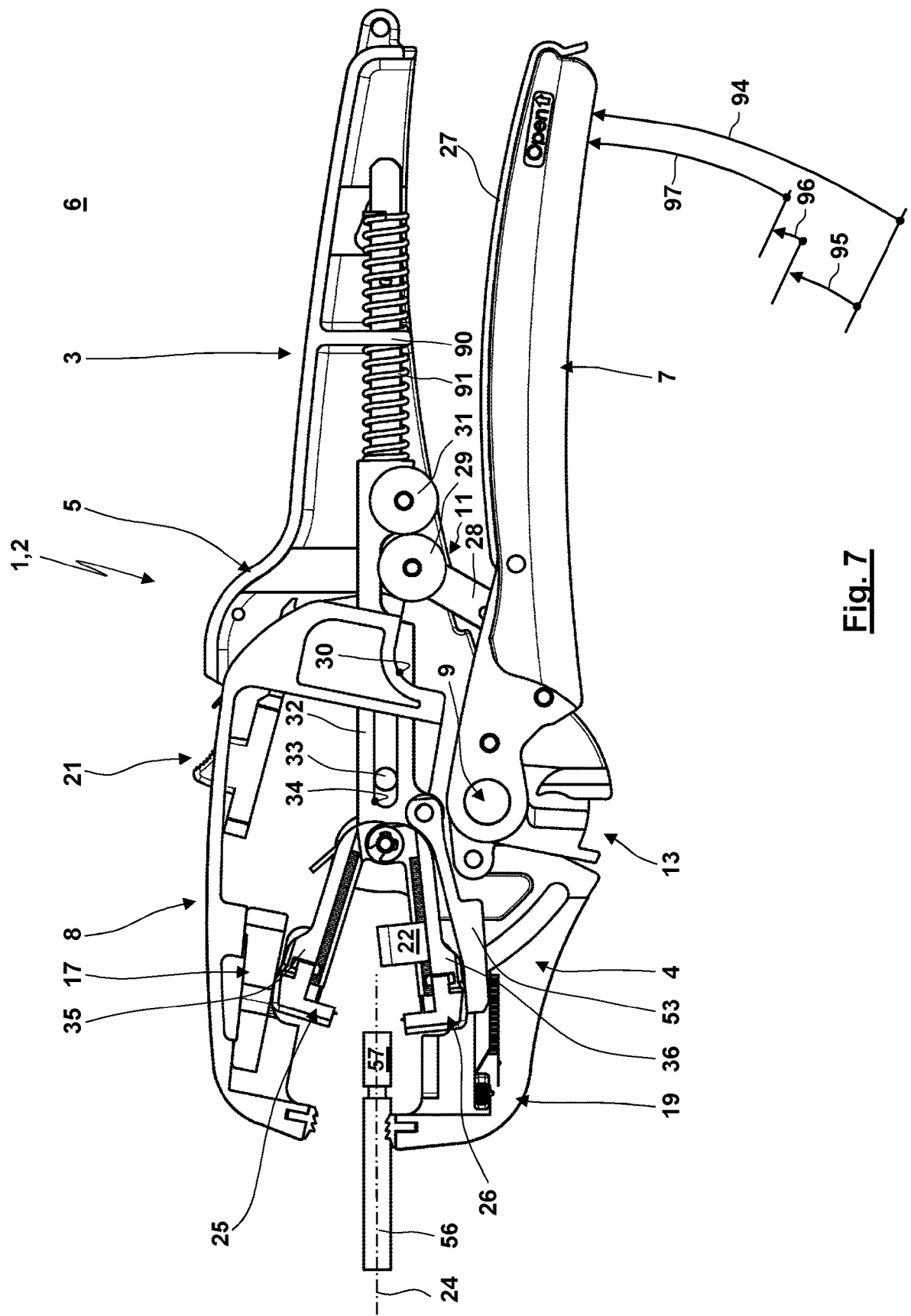
FIG. 7 shows the stripping pliers according to FIGS. 1 to 6 in a sectional view at the end of the free stroke part and of the closing stroke.
Figure 8:
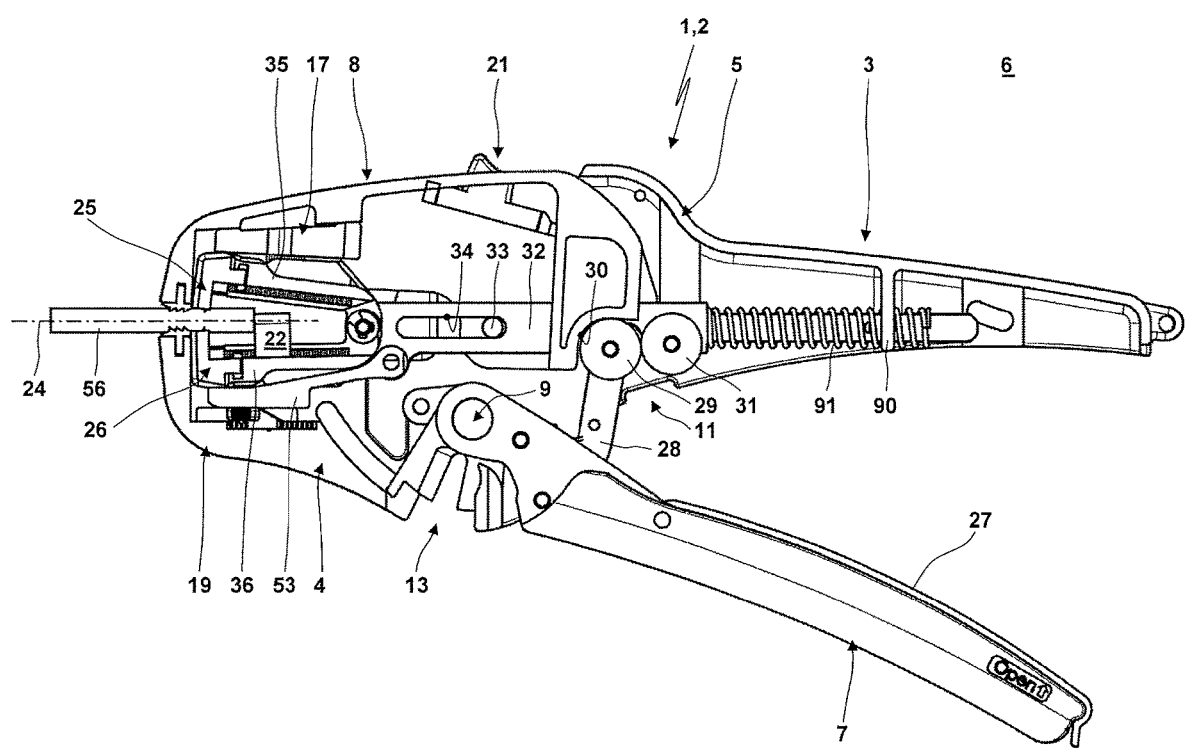
FIGS. 8 to 11 show representations of the stripping pliers according to FIGS. 1 to 7, here with a different transition point between the stripping stroke part and the free stroke part achieved by adjustment.
Figure 9:
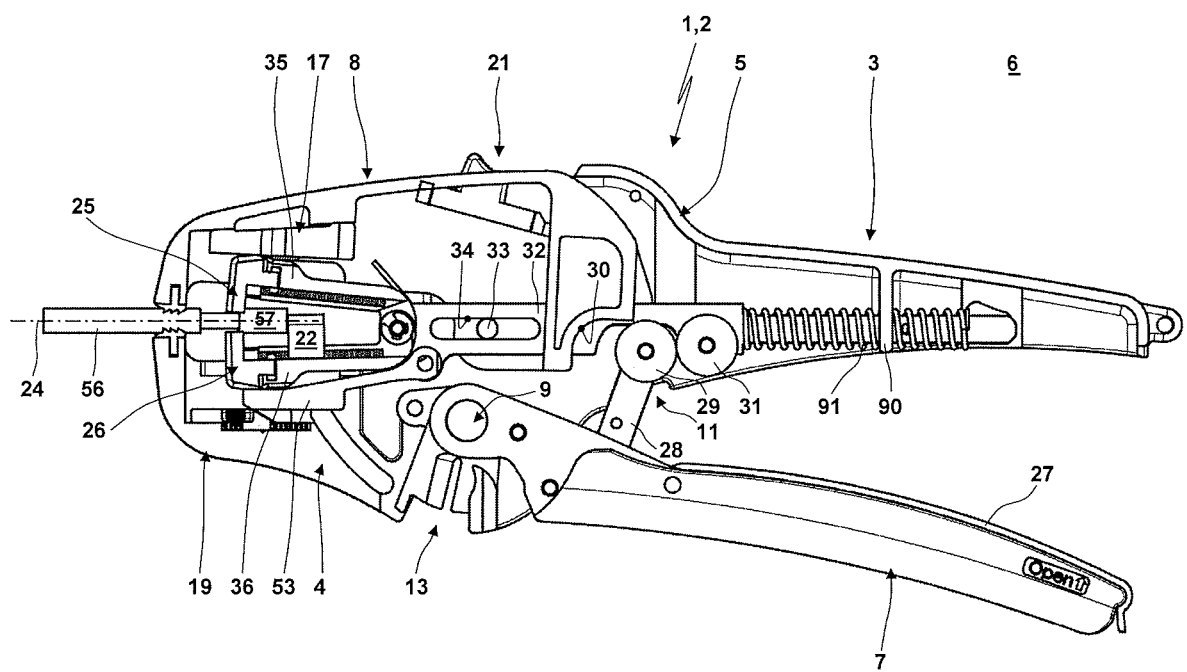
Figure 10:
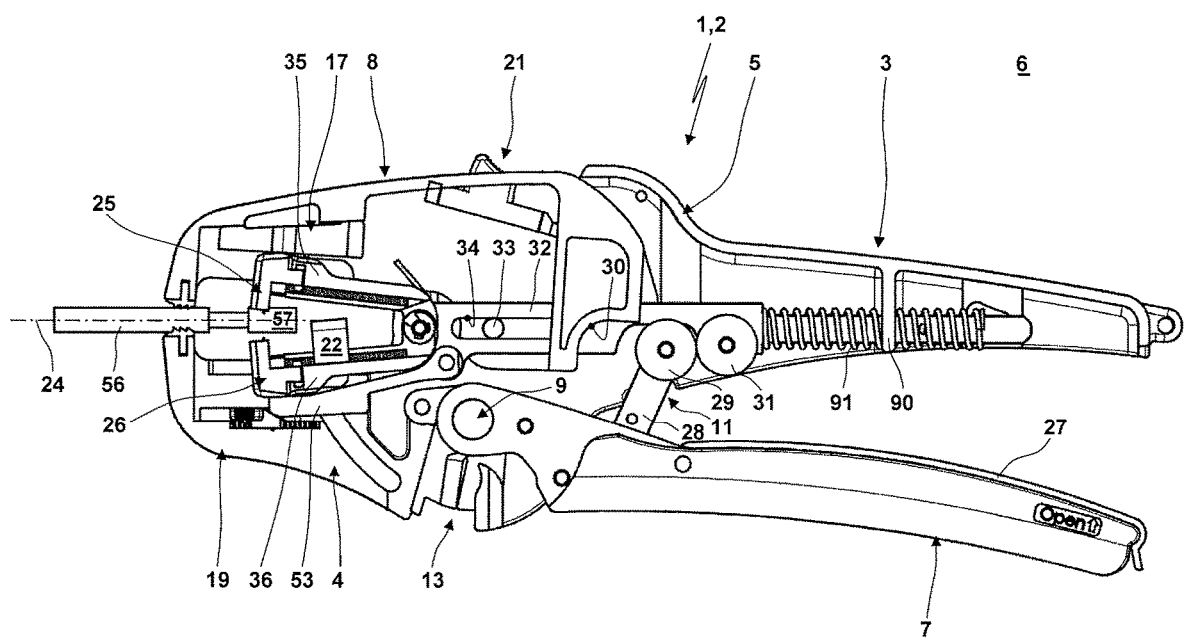
Figure 11:
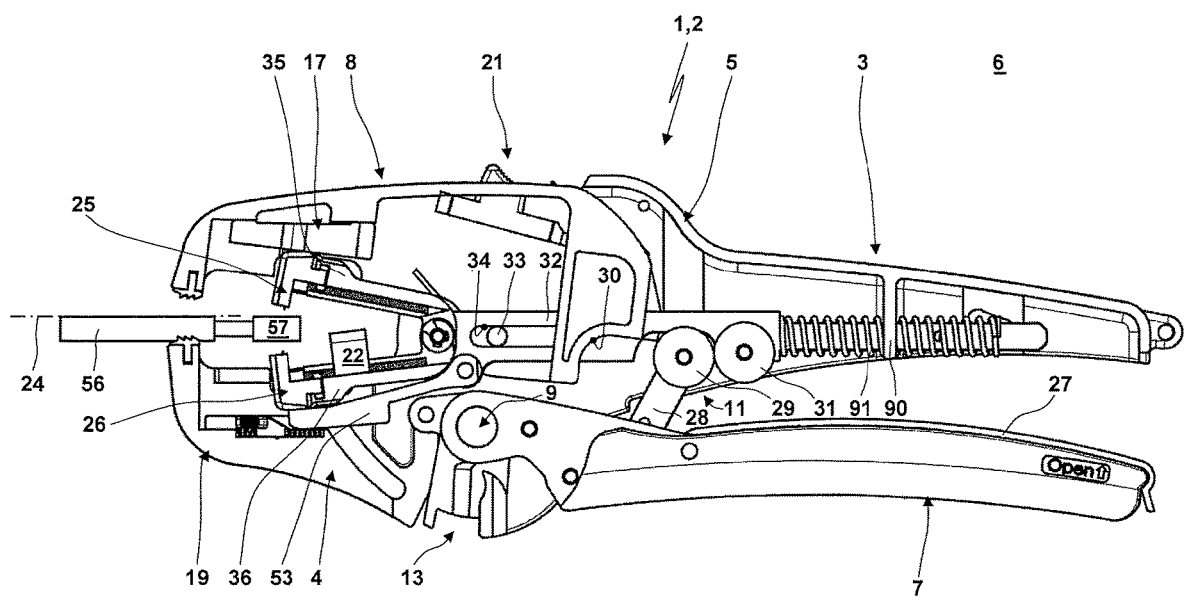

The stripping pliers 2 operate as follows:

a) At first a cable 56 is introduced into the bit of tongs 14 until the front side of the cable contacts the stop element 22. In some cases the stop element 22 is previously displaced and locked or latched in a position along the longitudinal axis 24 which correlates with the length of the sheeting to be stripped.

b) From the open position of the hand levers 3, 7 which correlates with open bit of tongs 14, in a cutting stroke part 95 the hand levers 3, 7 are pivoted towards each other. The hand force applied by the user upon the hand lever 7 is transferred via the pressure lever 28 to the roller 29. Due to the contact of the roller 29 with the guiding surface 30 of the pliers jaw 8, a closing movement is applied upon the pliers jaw 8 which leads to the closure of the bit of tongs 14. With the closure of the bit of tongs 14 the clamping jaws 15a, 15b are pressed against the outer surface of the cable 56 leading to a fixation of the cable in the stripping pliers with an orientation of the longitudinal axis of the cable being coaxial to the longitudinal axis 24. With the closing during the cutting stroke part 95 the stripping blades 25, 26 get into contact with the sheeting of the cable 56 on opposite sides of the cable 56. Due to the closing movement applied upon the pliers jaw 8, the stripping blades 25, 26 cut into the outer surface of the cable 56 until the position at the end of the cutting stroke part 95 shown in FIG. 3 is reached. In the ideal case, the stripping blades 25, 26 have only cut through the insulating sheeting up to the electrical wire without severing the electrical wire itself. It is possible that the cutting edges of the stripping blades 25, 26 are curved with an e.g. semi-circular shape with a radius corresponding to the radius of the electrical wire so that two continuous semi-circumferential cuts are produced. If this is not the case, it is also possible that only a part of the circumference of the sheeting of the cable 56 is cut so that in the subsequent stripping stroke part a braking-off will be required. The design matching of the orientation of the pressure lever 28 and the contact of the roller 29 with the guiding surface 30 is chosen such that during the cutting stroke part 95 only a movement of the pliers jaw 8 is caused by the pivoting movement of the hand lever 7. The actuation force transferred by the roller 29 linked to the pressure lever 28 to the roller 31 linked to the pulling rod 32 is smaller than the preload of the spring 91 having an opposite orientation and acting upon the pulling rod 32. Accordingly, during the cutting stroke part 95 the actuation force is not sufficient for causing a movement of the pulling rod 32.

c) When reaching the transition point from the cutting stroke part 95 to the subsequent stripping stroke part a further bias of the hand lever 7 leads to the result that the afore mentioned actuation force gets larger than the preload of the spring 91 so that a movement of the pulling rod 32 initiates. During the stripping stroke part the two blade holders 35, 36 with the stripping blades 25, 26 held thereat are caught between the adjusting body 40 and (here under interposition of the intermediate body 53) the guiding body 41 so that despite of the sliding movement relative to the adjusting body 40 and the guiding body 41 the distance of the two stripping blades 25, 26 from the longitudinal axis 24 does not change. As can be seen in FIG. 5, in the stripping stroke part a sleeve-like part 57 is stripped or pulled away from the remaining part of the sheeting of the cable 56. Accordingly, a region of the electrical wire is freed. During the stripping stroke part, the stripping blade 26 is guided in the stripping guiding region 48 which is formed by the guiding surface part 43 of the guiding surface 42 of the guiding body 41.

d) When the contact surface 55 of the intermediate body 53 approaches the transition point of the guiding surface part 43 to the guiding surface part 44, the free stroke part starts. During the free stroke part, the stripping blade 26 is supported (here indirectly via the contact surface 55 of the intermediate body 53) in the first free stroke guiding section 51 by the guiding surface part 44. As a result of the increasing distance from the longitudinal axis 24 due to the inclination of the guiding surface part 44 a movement of the stripping blade 26 in outer direction is caused so that the stripping blade 26 disengages with the part 57. Due to a superposition of the opening movement of the stripping blades 25, 26 with the simultaneous movement parallel to the longitudinal axis 24 caused by the pulling rod 32, the stripping blade 26 is passed besides or alongside the part 57 so that the part 57 is no longer stripped from the electrical wire. At the end of the first free stroke guiding section 51 the maximum distance 63 of the stripping blade 26 from the longitudinal axis 24 is reached. During the second free stroke guiding section 52 the stripping blade 26 is supported (here indirectly via the guiding surface 55 of the intermediate body 53) by the guiding surface part 45. In this second free stroke guiding section 52 the stripping blade 26 is moved with a constant distance 63 from the longitudinal axis 24 and the outer surface of the part 57 (see FIG. 6). Furthermore, during the free stroke part the roller 29 gets out of contact with the guiding surface 30 so that the pliers jaw 8 are no longer biased by a closing moment. Due to the bias of the pliers jaws 4, 8 by a spring in opening direction, the pliers jaws 4, 8 open so that at the end of the closing stroke 94 of the hand levers 3, 7 (which is composed of the cutting stroke part 95, the stripping stroke part 96 and the free stroke part) an open position of the bit of tongued according to FIG. 7 is achieved. In this open position it is possible to remove the cable with partially pulled off part 57 from the now open bit of tongs 14.

e) With a removal of the actuating forces from the hand levers 3, 7 it is possible to automatically open the hand levers 3, 7 by an opening spring and to restore the starting position.

The guiding body 41 is displaceable along the longitudinal axis 24. However, it is possible to fix the guiding body 41 by a latching, clamping or locking unit 92 to the pliers jaw 4. For the position of the adjusting unit 19 for adjusting the stripping stroke part 96 shown in FIGS. 3 to 7, the guiding body 41 is in a position where the stripping stroke part 96 is small. In the detailed view of FIG. 4 relative to the guiding body 41 by an arrow the working region 58 of the guiding body 41 and the guiding surface 42 is indicated which is used for this position of the adjusting unit 19 for adjusting the stripping stroke part 96 when running through the closing stroke 94. Here, the transition point 59 between the stripping stroke part 96 and the free stroke part is located at the beginning of the working region 48 so that the stripping stroke part 96 is comparatively small. If instead the guiding body 41 is displaced in FIG. 4 to the right by manipulation of the adjusting unit 19 for adjusting the stripping stroke part 96, a working region 60 results. For the working region 60 it is possible to use a larger region of the guiding surface part 43 and a smaller region of the guiding surface part 45 for the guidance. The transition point 61 is shifted so that there is an enlarged stripping stroke part 96 and a free stroke part reduced to the same extent. In FIGS. 8 to 11 the corresponding is shown for an enlarged stripping stroke part 96 by adjusting the adjusting unit 19 for adjusting the stripping stroke part 96 with a displacement of the guiding body 41 further away from the bit of tongs 14 and so for the shifting of the transition point 59 to the transition point 61.

Without a generally different function of the adjusting unit 19 for adjusting the stripping stroke part 96 resulting it is possible that there is no intermediate body 53 used. For the shown embodiment, the intermediate body 53 is provided for displacing the contact surface 55 with the guiding body 41 in such a way that also very small stripping stroke parts 96 can be achieved without the need for a modification of the outer surface of the blade holder 36 and the stripping blade 26. Furthermore, it is possible to purposeful provide the intermediate body 53 with a contact inclination 62. The inclination angle of the contact inclination 62 corresponds to the inclination angle of the guiding surface part 44 in order to provide a planar contact between the contact inclination 62 and the guiding surface part 44.

Figure 12:
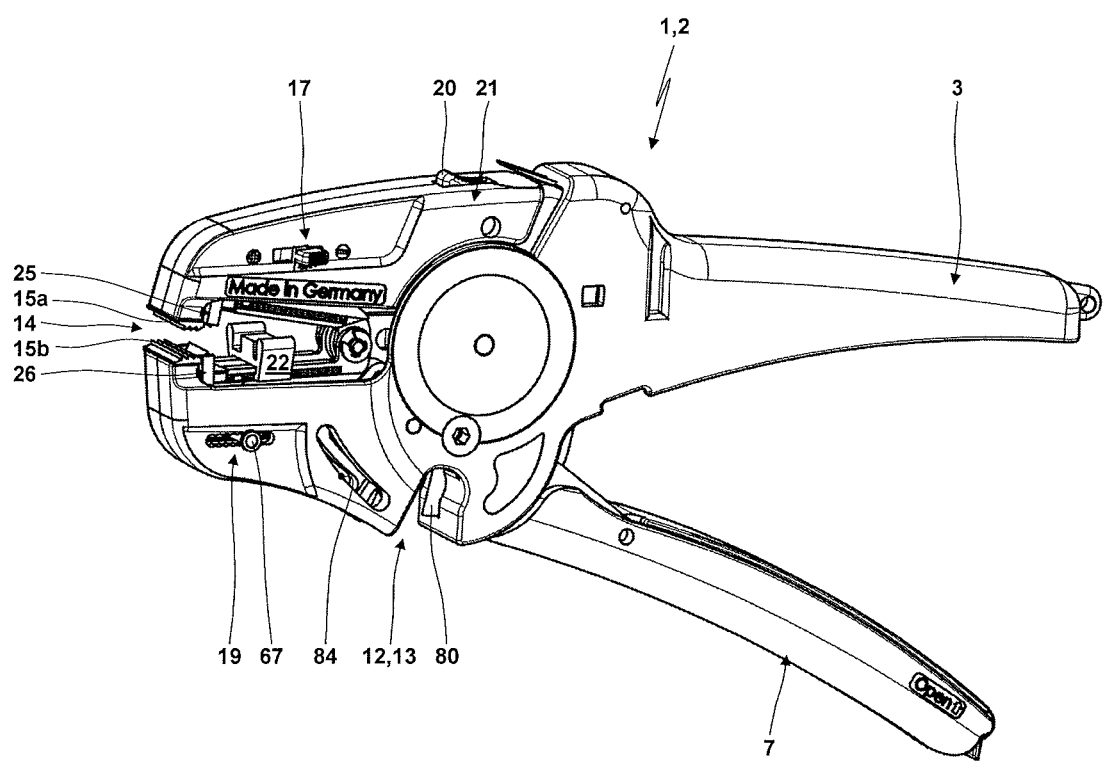
FIG. 12 shows another stripping pliers in a three-dimensional view.
Figure 13:
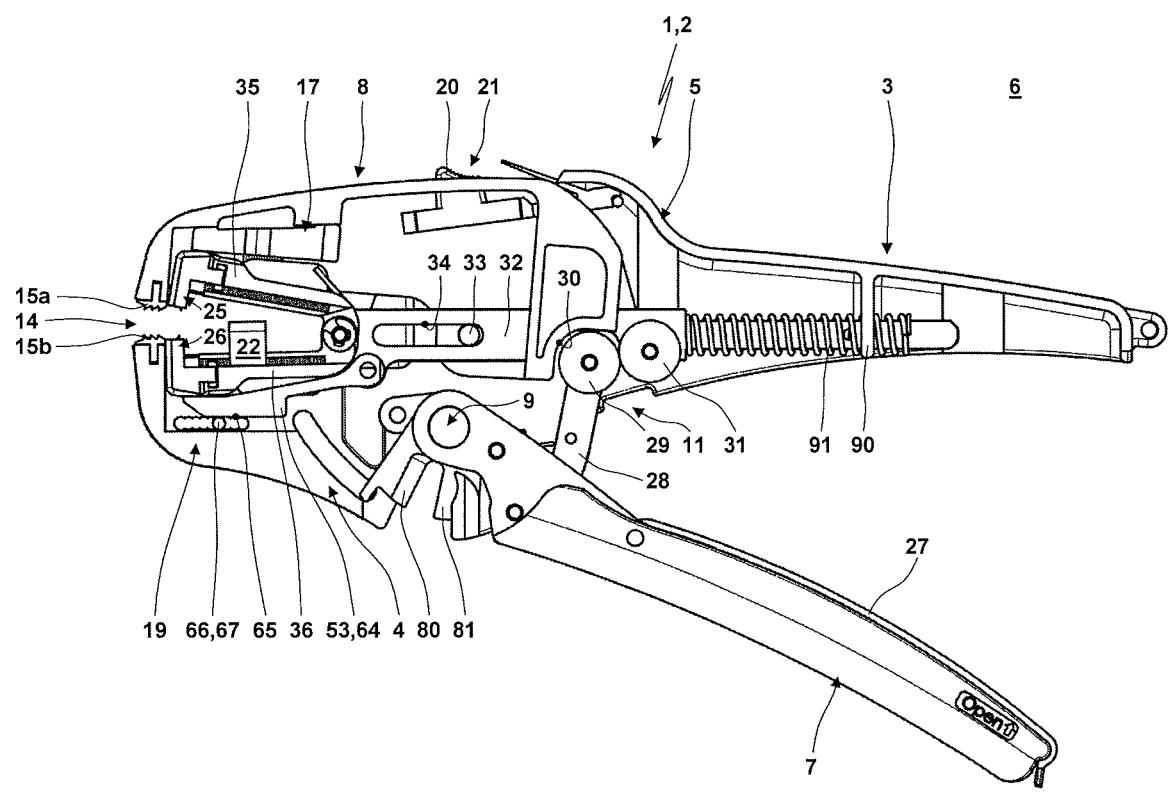
FIG. 13 shows the stripping pliers according to FIG. 12 in a sectional view.
Figure 14:
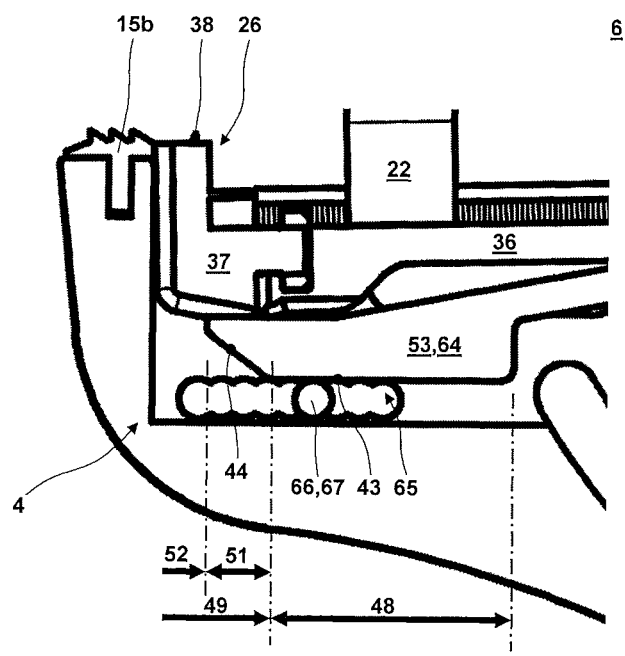
FIG. 14 shows a detail XIV of the stripping pliers according to FIG. 13.

FIGS. 12 to 14 show another embodiment of stripping pliers 2 which generally correspond to the stripping pliers according to FIGS. 1 to 11. However, here the stripping pliers 2 comprise a different adjusting unit 19 for adjusting the stripping stroke part: Whereas according to FIGS. 1 to 11 the guiding surface 42 of the guiding body 41 has an orientation in inner direction towards the longitudinal axis 24 so that the stripping blade 26 is supported in outer direction by the guiding surface 42, according to FIGS. 12 to 14 the guiding body 64 is formed by the intermediate body 53. In this case the guiding surface 65 has an orientation in outer direction, so away from the longitudinal axis 24. In this case the stripping blade 26 is supported via the guiding body 64 with the guiding surface 65 in outer direction by a supporting body 66 which is here formed by a supporting bolt 67. During the closing stroke, the supporting body 66 is fixed to the pliers jaw 4. For adjusting the transition point from the stripping stroke part to the free stroke part 97 it is possible to displace the supporting body 66 (at least with one component of the displacement) in a direction parallel to the longitudinal axis 24 relative to the pliers jaw 4. After such an adjustment of the stripping stroke part the supporting body 66 is latched, blocked or locked by a latching, clamping or locking unit 92. Without this necessarily being the case, the guiding surface 65 comprises only a here level guiding surface part 43 having an orientation parallel to the longitudinal axis 24 (which is associated with the stripping guiding region 48) and a here level and in inner direction inclined guiding surface part 44 (by which the free stroke guiding region 49, namely a first free stroke guiding section 51, is formed). If a second free stroke guiding section 52 is required as a component of the free stroke guiding region 49, for the second free stroke guiding section 52 the supporting body 66 gets out of contact with the intermediate body 53 formed by the guiding body 64. It is e.g. possible that the supporting body 66 gets into contact with the base body 37.

Figure 15:
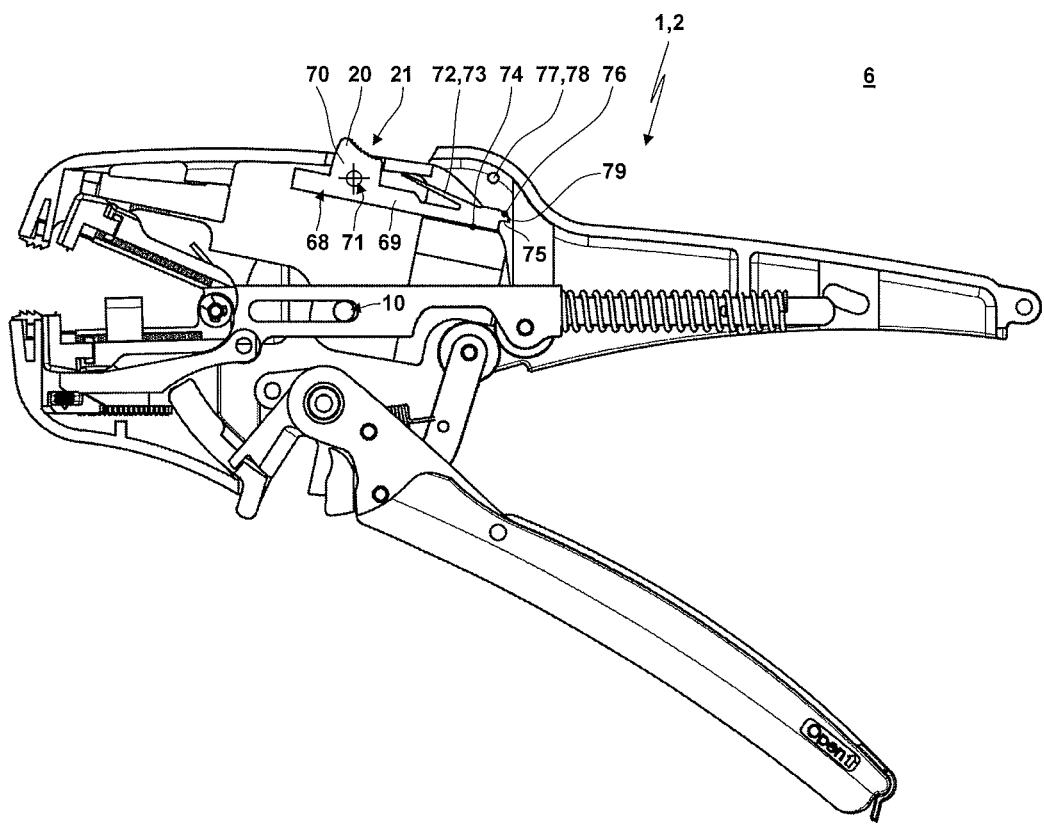
FIGS. 15 to 17 show another embodiment of stripping pliers in a sectional view in a starting position (FIG. 15), for partially closed hand levers (FIG. 16) and a latched position with partially closed bit of tongs (FIG. 17).
Figure 16:
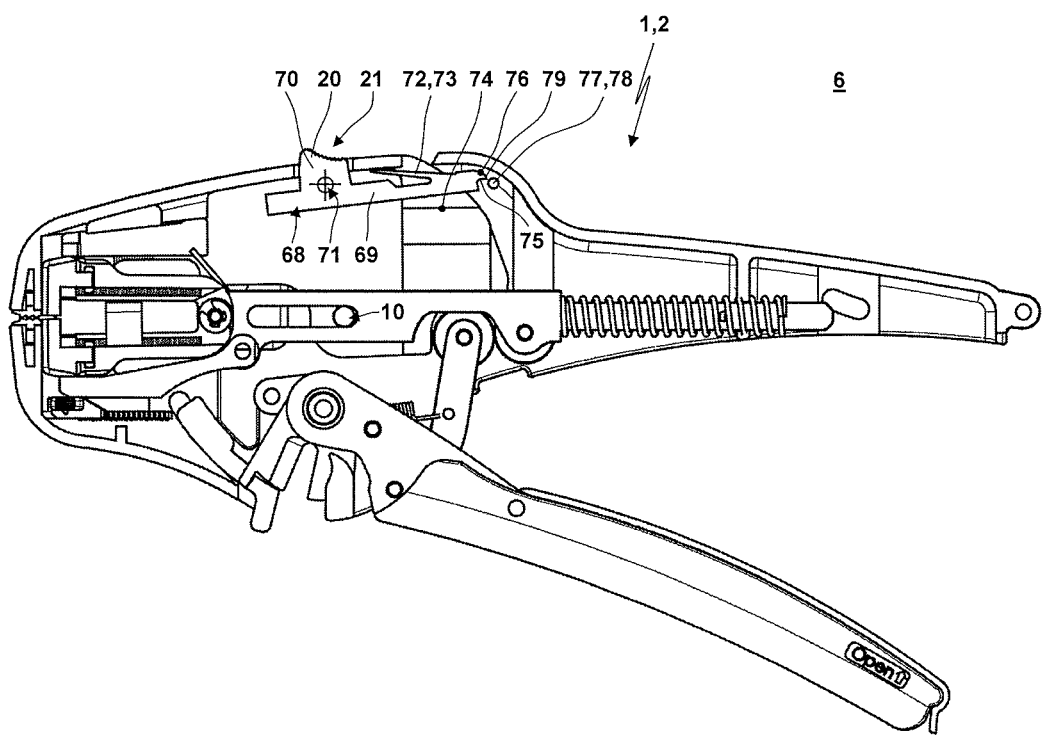
Figure 17:
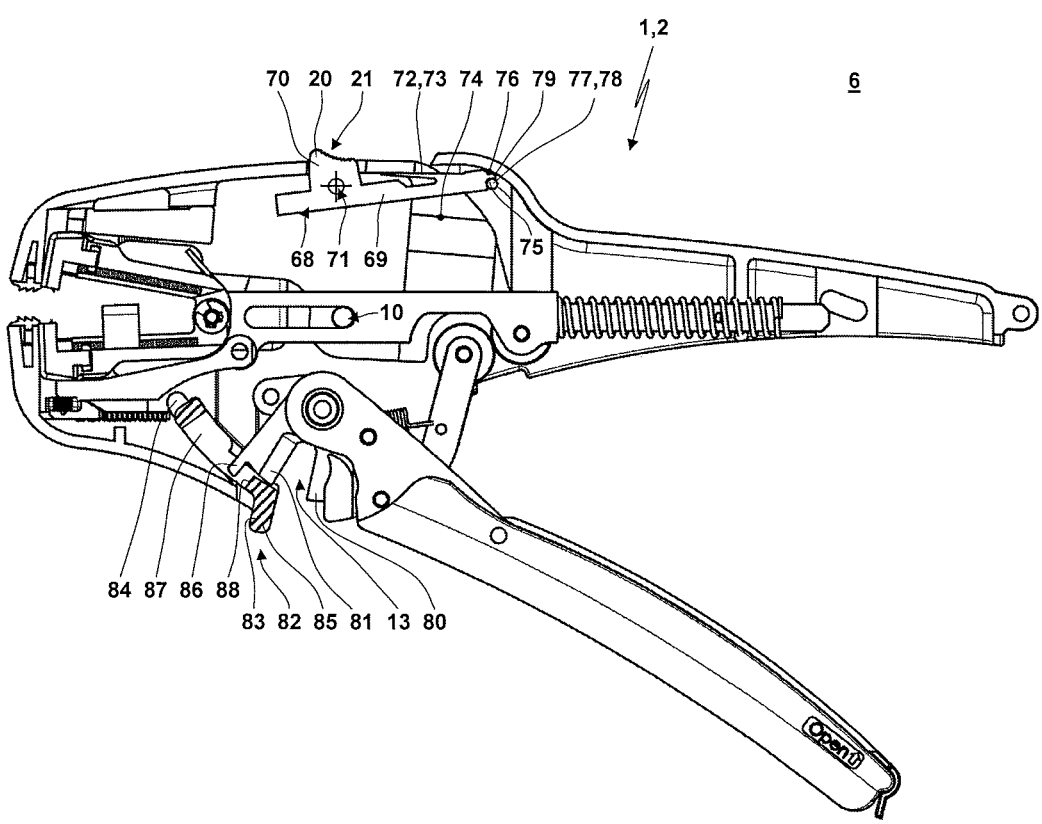

In the FIGS. 15 to 17 the mode of operation of the securing unit 21 is shown which builds an optional variant of the stripping pliers 2. The securing unit 21 is formed with a securing lever 68 which is in a rough simplification L-shaped with perpendicular legs 69, 70 of the L. The end region of the leg 70 forms the actuation means 20 of the securing unit 21. In the connecting region of the legs 69, 70 a bearing 71 is located. In the region of the bearing 71 the securing lever 68 is linked for being pivoted in the pivoting plane 6 to the pliers jaw 8. By a spring 72 (which is here formed by an integral spring arm 73 of the securing lever 68) the securing lever 68 in the FIGS. 15 to 17 is biased towards a stop element 47 which is formed by the pliers jaw 8. The spring arm 73 protrudes from the leg 69 of the securing lever 68 and is supported with its free end region at the pliers jaw 8. The end region of the leg 69 facing away from the bearing 71 comprises an undercut 75 on the side facing away from the spring 72 and an inclined surface 76 on the opposite side. Here, the planar or curved inclined surface 76 has a design such that with a pivoting movement of the pliers jaw 8 around the bearing 10 relative to the housing body 5 it is possible to pass the inclined surface 76 just besides a locking body 77 (in particular a locking pin) supported by the hand lever 3 if due to the bias by the spring 72 the securing lever 68 contacts the stop element 47. This is both the case for the movement in opening direction and in closing direction so that without any separate actuation of the actuation means 20 the securing unit 21 is not activated. If instead the activation of the securing unit 21 is intended, for a partial closure of the hand levers 3, 7 for which the nose 79 formed between the undercut and the inclined surface 76 has just passed the locking element 77 the actuation means 20 is actuated so that the securing lever 68 is actuated in counter-clockwise direction under bias of the spring 72 by the user. Due to the geometric properties (namely on the one hand the pivoting of the securing lever 68 around the bearing 71 with the radius of the distance of the nose 79 from the bearing 71 and on the other hand the pivoting of the pliers jaw 8 with the locking element 77 held thereat around the bearing 10 with the radius of the distance of the locking element 77 from the bearing 10) in a subsequent opening movement of the hand levers 3, 7 (which a caused by an opening spring when removing the bias of the hand levers 3, 7) the undercut 75 contacts the locking element 77. The locking element 77 is pressed by the afore mentioned opening spring against the undercut 75 so that the bias of the spring 72 is upheld. Accordingly, a partially closed position of the stripping pliers 2 according to FIG. 17 is secured by the securing unit 21. If the user subsequently again applies actuating forces in closing direction to the hand levers 3, 7, this leads to a reduction of the contact force between the locking element 77 and the undercut 75 of the securing lever 68. Accordingly, the spring 72 is able to pivot the securing lever 68 in clockwise direction until the securing lever 68 contacts the stop element 74. However, in this closed state it is again possible to pass the nose 79 besides the locking element 77 so that the securing unit 71 is deactivated and an opening movement of the securing unit 21 is possible.

Figure 18:
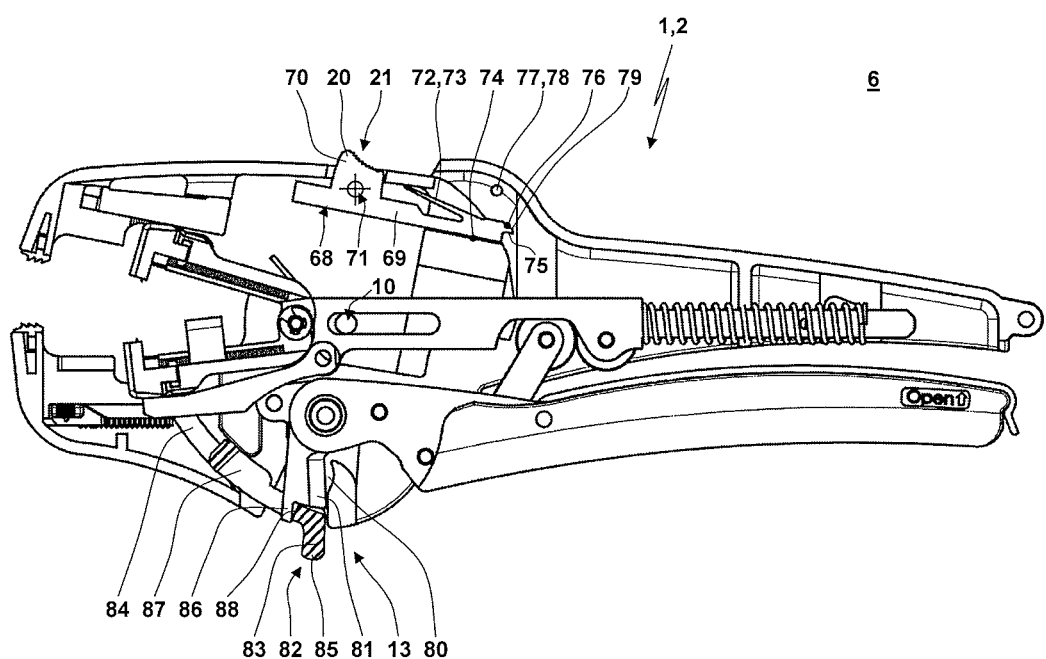
FIG. 18 shows a sectional view of the stripping pliers according to FIGS. 15 to 17 after the closure of a separating unit by a protecting unit.
Figure 19:
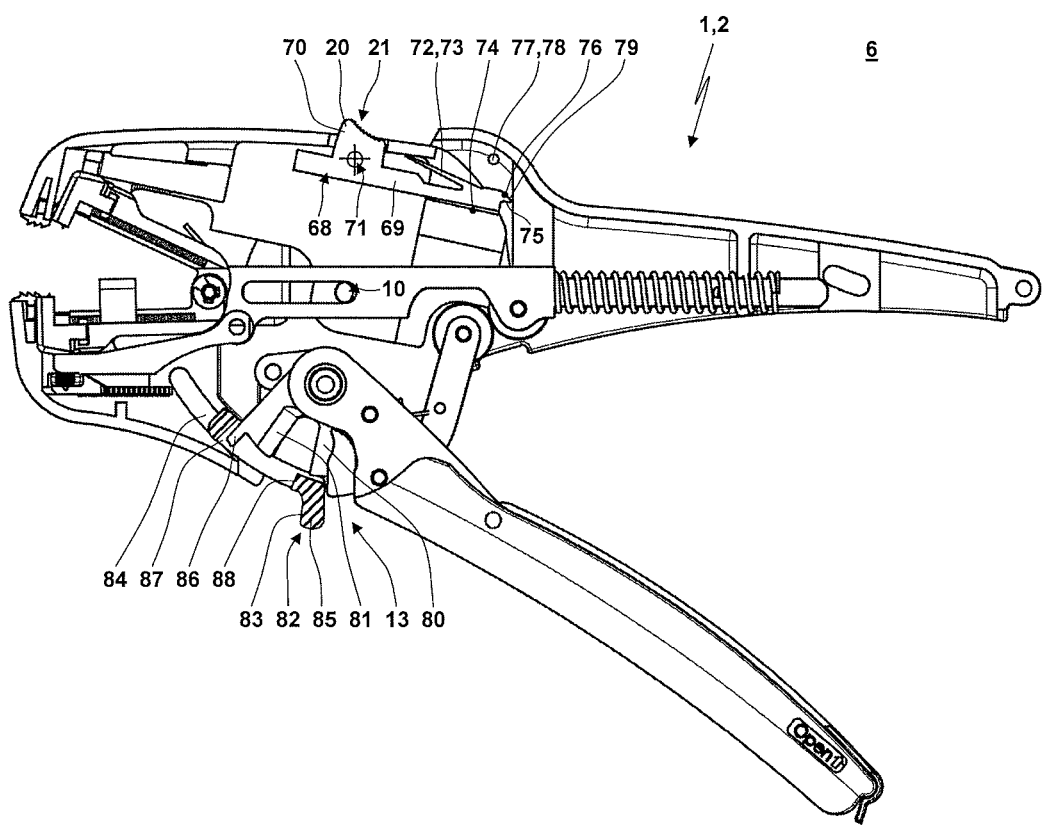
FIG. 19 shows the stripping pliers according to FIGS. 15 to 18 after the reopening of the hand levers, the protecting unit still closing the separating unit.

The stripping pliers 2 might optionally comprise a separating unit 13. The separating unit 13 is formed with a first separating blade 80 which is rigidly held by the housing body 5. The cutting edge of the first separating blade 80 has an orientation radial to the bearing 9 for the hand lever 7. Another separating blade 81 is rigidly held by the hand lever 7. For the shown embodiment, the separating blade 81 extends vertically to the longitudinal extension of the hand lever 7. Here, the cutting edge of the separating blade 81 has an orientation radial to the bearing 9. In the closed state of the hand levers 3, 7 the cutting edges of the separating blades 80, 81 contact each other so that in this closed state a cable introduced into the separating unit 13 is completely cut through by the separating blades 80, 81. It is possible to close the recess wherein the separating unit 13 is formed by a protecting unit 82 against the environment. The protecting unit 82 covers the separating blades 80, 81 and their cutting edges from the outside. For this purpose, a lid, cover body or protective body 83 is movably supported or guided between an open state and a closed state by the housing body 5. For the shown embodiment, the protective body 83 is guided along a curved track which is here defined by curved grooves or slits 84 of the walls of the housing body 5. Transverse protrusions of the protective body 83 are guided in the curved grooves or slits 84. FIG. 17 shows the protective body 83 in the open position, whereas FIG. 18 shows the protective body 83 in the closed position. It is possible that the transfer of the protective unit 82 from the open position into the closed position and vice versa is caused by the user by manual manipulation of an actuation means 85 of the protective body. As an optional feature, FIGS. 17 to 19 show an embodiment wherein with the closing movement of the hand levers 3, 7 the protective body 83 is automatically transferred from the open position according to FIG. 17 into the closed position according to FIG. 18. The closed position is upheld during a subsequent opening of the hand levers 3, 7 (FIG. 19). For this purpose, the hand lever 7 comprises a follower 86, which is here formed by a protrusion of the separating blade 81. The follower 86 engages a slit or elongated hole 87 of the protective body 83. If the hand levers 3, 7 are open according to FIG. 17, it is at first possible to manually transfer the protective body 83 from the open position into the closed position and vice versa. During this movement the follower 86 moves in the elongated hole 87. In the open position (FIG. 17) the follower 86 has a small distance from a limitation 88 of the elongated hole 87. If there is a closing movement of the hand levers 3, 7 from the open position according to FIG. 17 into the closed position according to FIG. 18, the follower 86 comes into contact with the limitation 88 of the elongated hole 87. Accordingly, with a further closure of the hand levers 3, 7 the movement of the hand lever 7 via the follower 86 and the limitation 88 of the elongated hole 87 takes the protective body 83 along into the closed position (FIG. 18). If there is a subsequent reopening of the hand levers 3, 7, the follower 86 moves away from the limitation 88 of the elongated hole 87 with subsequent movement of the follower 86 along the elongated hole 87. During this movement there is no coupling between the hand lever 7, the follower 86 and the protective body 83. Accordingly, it is possible to move the hand lever 7 in opening direction without at the same time opening the protective device 82. If instead the use of the cutting unit 13 is intended, it is required to manually retransfer the protective body 83 again into the open position by the actuation means 85. For a modified (here not shown) embodiment, the protective body 83 is not formed with an elongated hole 87. Instead, in this case the protective body 83 comprised a protrusion which interacts with the follower 86.

The invention also covers embodiments wherein a adjusting unit 19 for adjusting the stripping stroke part is provided at both of the pliers jaws 4, 8. However, it is a surprising finding of the invention that in some cases it is sufficient if there is only one adjusting unit 19 for adjusting the stripping stroke part at one pliers jaw 4.

In some cases during the free stroke part 97 there is a small deformation of the cable 5, 6 away from the stripping blade 25 which is not supported by an adjusting unit 19 for adjusting the stripping stroke part so that also this stripping blade 25 is passed besides the part 57. This effect might in some cases be supported by a certain inclination of the stripping blade 25 relative to the transverse plane so that the contact of the front side of the part 57 with the stripping blade 25 causes a force component which presses the stripping blasé 25 in outer direction.

Functional units adjustable by the user (in particular the adjusting unit 17 for adjusting the cutting depth, the adjusting unit 19 for adjusting the stripping stroke part and/or the stop element 22) are connected to adjacent components by latching, clamping and/or locking units common in this technological field in a way that it is on the one hand possible to provide an adjustment (in some cases under use of actuation means 16, 18) and on the other hand there is no movement from the positions secured by the latching, clamping and/or locking unit due to the forces being present in operation. To mention only one example, it is possible that the guiding body 41 of the adjusting unit 19 for adjusting the stripping stroke part comprises spring arms which form latching noses in one end region which are latched or locked with the pliers jaw 4. A change of the position of the guiding body 41 might be caused by applying sufficient forces in adjusting direction upon the actuation means 20, wherein the latching connection is overcome by "overpressing". However, it is also possible that it is required to first apply separate forces for unlatching or unlocking upon an actuation means in order to disengage the actuation means from a counter latching recess or counter locking recess before it is possible to move the guiding body 41 in adjusting direction. For a particular embodiment of the invention the guiding body 41 comprises a spring arm (preferably two spring arms) with both a lateral latching nose as well as a lower latching nose being provided which each engage corresponding latching or locking recesses of the pliers jaw 4. Here, the lateral nose and the lower nose might serve for different purposes. It is e.g. possible that one of the noses serves for locking so that a release of the nose requires a separate actuation of an actuation means, whereas the other nose builds a latching which might be overcome by applying forces in adjusting direction. Here the latching defines preferred positions of the adjusting unit 19 for adjusting the stripping stroke part.

As shown in the figures, the adjusting unit 19 for adjusting the stripping stroke part and the adjusting unit 17 for adjusting the cutting depth are preferably built separately from each other with an actuation of the same by separate actuation means 18, 20. However, it is also possible that the adjusting unit 17 for adjusting the cutting depth is coupled to the adjusting unit 19 for adjusting the stripping stroke part. The afore mentioned coupling provides that at the same time with the adjustment of the cutting depth also the stripping stroke part (and vice versa) is adjusted so that it is possible to actuate the adjusting units 17, 19 also by a common actuation means.

If it is possible to assemble and disassemble the stripping blades 25, 26 by a movement transverse to the longitudinal axis 24 from the blade holders 35, 36 (as in particular described in the non-published European patent application EP 14 177 826.6), it is possible that the transverse degree of freedom of the stripping blades 25, 26 is blocked by the wall of the pliers jaw 4. It is possible that the wall of the pliers jaw 4 comprises a window or recess 89 as shown with dashed line in FIG. 1. If the stripping blade 25, 26 approaches a predetermined position in the region of the recess 89, for this predetermined operational position of the stripping pliers 2 it is possible to remove the stripping blade 26 in transverse direction. However, in some cases also the relative position of the stripping blade 26 to the recess 89 is influenced by the adjusting unit 19 for adjusting the stripping stroke part: If the support of the stripping blade 26 for an adjustment for a very small stripping stroke part is located in the free stroke guiding region 49 of the guiding body 41, the stripping blade 26 is located further in the interior of the pliers jaw 4 so that despite of the recess 89 it is not possible to remove the stripping blade 26 from the pliers jaw 4 in transverse direction. Accordingly, the removal and the exchange of the stripping blade 26 might require an adjustment of the adjusting unit 19 for adjusting the stripping stroke part to a predetermined region, preferably to the maximum of the stripping stroke part. In this way it is possible to increase the operational safety of the stripping pliers 2 because an additional securing measure is provided against an undesired removal of the stripping blades 26 from the stripping pliers 2.

For designing the force conditions at the stripping pliers 2 and for causing an automized movement of components, there might be provided additional, here not described springs in the stripping pliers 2 of which only some are shown in the figures.

Many variations and modifications may be made to the preferred embodiments of the invention without departing substantially from the spirit and principles of the invention. All such modifications and variations are intended to be included herein within the scope of the present invention, as defined by the following claims.

I claim:
1. Stripping tool comprising:
a housing;
a fixed hand lever fixedly coupled to the housing;
a fixed pliers jaw fixedly coupled to the housing;
a movable hand lever pivotally coupled to the housing for being pivoted in a pivoting plane;
a movable pliers jaw pivotally coupled to the housing for being pivoted in the pivoting plane;
a drive kinematic that couples pivoting movement of the movable hand lever to pivoting movement of the movable pliers jaw;
at least one blade holder coupled to one of the fixed and the movable pliers jaw;
at least one stripping blade held by the at least one blade holder, wherein a closing stroke of the stripping tool that is performed by pivoting the movable hand lever toward the fixed hand lever comprises:
a) a cutting stroke part, wherein the at least one stripping blade is moved from a first open position into a closed position in a direction transverse to, and toward, a longitudinal axis of an accommodation for a cable, and wherein in the closed position, the at least one stripping blade cuts into an insulating sheeting of the cable,
b) a stripping stroke part, wherein while in the closed position, the at least one stripping blade is moved parallel to the longitudinal axis of the accommodation to at least partially remove a portion of the insulating sheeting of the cable, and
c) a free stroke part, wherein the at least one stripping blade is moved with an opening movement from the closed position to a second open position in which the at least one stripping blade is a greater distance from the longitudinal axis of accommodation than in the closed position, and wherein the opening movement of the stripping blade comprises at least a transverse movement component having an orientation that is transverse to, and away from, the longitudinal axis of the accommodation, and
an adjusting unit comprising a guide to selectively adjust a transition point of the closing stroke from the stripping stroke part to the free stroke part.

2. Stripping tool of claim 1, wherein
a) the stripping blade is guided by the guide,
b) the guide comprises
ba) a stripping guiding region wherein the stripping blade is guided parallel to the longitudinal axis of the accommodation with a first distance from the longitudinal axis, and
bb) a free stroke guiding region wherein the stripping blade is guided at least with a component of the movement having an orientation parallel to the longitudinal axis of the accommodation with a second distance from the longitudinal axis, the second distance being larger than the first distance, and
c) wherein a transition point from the stripping guiding region to the free stroke guiding region is adjustable.

3. Stripping tool of claim 2, wherein the guide is formed with a guiding body,
a) by which the stripping blade is supported in a direction transverse to the longitudinal axis of the accommodation and
b) which comprises a guiding surface which
ba) is formed with a level guiding surface part in a stripping guiding region,
bb) is formed with at least one of
an inclined or slanted guiding surface part and
a guiding surface part having a distance from the longitudinal axis of the accommodation differing from the distance of the level guiding surface part in the stripping guiding region in the free stroke guiding region.

4. Stripping tool of claim 3, wherein
a) during the closing stroke the guiding body is held at a fixed location at a tool jaw,
b) the stripping blade is supported by a rolling or sliding contact with the guiding surface of the guiding body in outer direction and
c) the guiding body is displaceable relatively to the tool jaw parallel to the longitudinal axis of the accommodation for adjusting the transition point from the stripping guiding region to the free stroke guiding region.

5. Stripping tool of claim 4, wherein different positions of the guiding body or the supporting body are secured by a latching, clamping or locking unit.

6. Stripping tool of claim 5, wherein an intermediate body is interposed between the stripping blade and the guiding body which is moved by a drive of the stripping tool together with the stripping blade and which forms a contact surface which moves with a sliding movement along the guiding surface of the guiding body.

7. Stripping tool of claim 4, wherein an intermediate body is interposed between the stripping blade and the guiding body which is moved by a drive of the stripping tool together with the stripping blade and which forms a contact surface which moves with a sliding movement along the guiding surface of the guiding body.

8. Stripping tool of claim 3, wherein
   a) during the closing stroke the guiding body is moved relatively to a tool jaw and
   b) the guiding body with the guiding surface is supported for a rolling or sliding movement by a supporting body which is held at a fixed location at the tool jaw during the closing stroke,
   c) for adjusting the transition point from the stripping stroke guiding region to the free stroke guiding region it is possible to displace the supporting body relatively to the tool jaw parallel to the longitudinal axis of the accommodation.

9. Stripping tool of claim 8, wherein different positions of the guiding body or the supporting body are secured by a latching, clamping or locking unit.

10. Stripping tool of claim 1, wherein at least one of the stripping blade, the blade holder, an intermediate body and a guiding body is coupled to a pulling rod, the pulling rod being moved parallel to the longitudinal axis of the accommodation of the stripping tool when running through the closing stroke.

11. Stripping tool of claim 10, wherein the pulling rod
    a) is not moved during the cutting stroke part and
    b) is moved parallel to the longitudinal axis both during the stripping stroke part as well as during the free stroke part.

12. Stripping tool of claim 11, wherein the pulling rod is actuated by a pressure lever linked in one end region to a movable hand lever, the other end region of the pressure lever being supported for a rolling or sliding movement by a guiding surface of a movable tool jaw during the closing stroke and being supported for a rolling or sliding movement by the pulling rod, the distribution of the force in the pressure lever to the guiding surface of the movable tool jaw and to the pulling rod depending on the inclination of the guiding surface and an angle of the pressure lever.

13. Stripping tool of claim 10, wherein the pulling rod is actuated by a pressure lever linked in one end region to a movable hand lever, the other end region of the pressure lever being supported for a rolling or sliding movement by a guiding surface of a movable tool jaw during the closing stroke and being supported for a rolling or sliding movement by the pulling rod, the distribution of the force in the pressure lever to the guiding surface of the movable tool jaw and to the pulling rod depending on the inclination of the guiding surface and an angle of the pressure lever.

14. Stripping tool of claim 1, wherein a securing unit is provided by which it is possible to secure the stripping tool in an at least partially closed position.

15. Stripping tool of claim 14, wherein the securing unit is automatically released by actuation of a drive of the stripping tool.

16. Stripping tool of claim 1, wherein a separating unit is provided for cutting through a cable, the separating unit being closable by a protective unit.

17. Stripping tool of claim 16, wherein the protective unit is automatically transferred into a protective position when running through the closing stroke, the protective unit remaining in the protective position also when reversing the closing stroke.

18. Stripping tool of claim 1, wherein an adjusting unit for adjusting the cutting depth is provided by which it is possible to adjust the closed position at the end of the cutting stroke part.

19. Stripping tool of claim 18, wherein the adjusting unit used for adjusting the closed position and a guide of the stripping blade comprising a stripping guiding region for the stripping stroke part and a free stroke guiding region for the free stroke part are linked with different tool jaws or formed by different tool jaws.

20. Stripping tool of claim 1, wherein the closing stroke comprises an opening stroke part following the free stroke part.

21. Stripping tool of claim 1, wherein the stripping blades are exchangeable, an exchange of the stripping blades only being possible if the transition point from the stripping stroke part to the free stroke part
    a) corresponds to a predetermined transition point or
    b) is within a predetermined transition region.

22. Stripping tool of claim 1, wherein
    a) the stripping blade is supported by the guide in a direction transverse to the longitudinal axis of the accommodation,
    b) the guide comprises
       ba) a stripping guiding region wherein the stripping blade is guided parallel to the longitudinal axis of the accommodation with a first distance from the longitudinal axis, and
       bb) a free stroke guiding region wherein the stripping blade is guided at least with a component of the movement having an orientation parallel to the longitudinal axis of the accommodation with a second distance from the longitudinal axis, the second distance being larger than the first distance,
    c) wherein a position of a transition point from the stripping guiding region to the free stroke guiding region is adjustable by manually adjusting the position of the guide relative to the associated jaw.

23. Stripping tool of claim 1, wherein the opening movement further comprises a longitudinal movement component having an orientation parallel to the longitudinal axis of the accommodation so that the opening movement is at an acute angle relative to both the longitudinal direction and the transverse direction.

24. Stripping tool of claim 1, wherein the opening movement further comprises a longitudinal movement component having an orientation parallel to the longitudinal axis of the accommodation subsequent to the transverse movement component.

25. A stripping tool comprising:
    a housing;
    a fixed hand lever fixedly coupled to the housing;
    a fixed pliers jaw fixedly coupled to the housing;
    a movable hand lever pivotally coupled to the housing;
    a movable pliers jaw pivotally coupled to the housing;
    at least one stripping blade coupled to each of the fixed and the movable pliers jaw;
    wherein the movable hand lever is pivoted from a first position, in which the movable hand lever is a first distance from the fixed hand lever, to a second position in which the movable hand lever is a second distance from the fixed hand lever that is less than the first distance to define a closing stroke, and wherein the closing stroke comprises:

a) a cutting stroke part, wherein the at least one stripping blade is moved from an open position into a closed position in a direction transverse to, and toward, a longitudinal axis of an accommodation for a cable, and wherein in the closed position, the at least one stripping blade contacts a portion of the cable,
b) a stripping stroke part, wherein while in the closed position, the at least one stripping blade is moved parallel to the longitudinal axis of the accommodation to at least partially remove a portion of the cable, and
c) a free stroke part, wherein the at least one stripping blade is moved from the closed position to an open position in which the at least one stripping blade is a greater distance from the longitudinal axis of accommodation than in the closed position; and an adjusting unit actuated independently of the fixed and movable hand levers to selectively adjust at least two of a cutting depth of the at least one stripping blade, the length of the cutting stroke part, the length of the stripping stroke part, and the length of the free stroke part.

* * * * *